(12) United States Patent
Cramer et al.

(10) Patent No.: US 6,304,651 B1
(45) Date of Patent: Oct. 16, 2001

(54) COMMUNICATING NETWORK RESOURCE LOCATORS TO CUSTOMER PREMISES EQUIPMENT USING MODIFIED RING ACCESS

(75) Inventors: Seth Whitney Cramer; Bertrand Marc-Andre Michaud; Charles Gerald Rohs; Daniel John Paslawski; Qi Li; Kevin Chi Hin Lo, all of Calgary (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/109,863

(22) Filed: Jul. 6, 1998

(51) Int. Cl.$^7$ .................................................. H04M 7/00
(52) U.S. Cl. ................... 379/221.01; 709/228; 709/229; 707/10
(58) Field of Search .......................... 379/221; 709/219, 709/222.3, 218, 228, 229, 206, 217; 707/500, 517, 10; 370/352, 401

(56) References Cited

U.S. PATENT DOCUMENTS

| | | | |
|---|---|---|---|
| 4,582,956 | * 4/1986 | Doughty | 379/142 X |
| 5,521,964 | 5/1996 | Shull et al. | 379/67 |
| 5,999,526 | * 12/1999 | Garland et al. | 379/93.01 X |
| 6,081,842 | * 6/2000 | Shachar | 709/229 |

* cited by examiner

Primary Examiner—Creighton Smith
(74) Attorney, Agent, or Firm—Cobrin & Gittes

(57) ABSTRACT

A method and system for downloading a file to a subscriber telephone. The system includes a modified ring access server for producing a modified ring access message including a first network resource locator, a central office service unit for producing a modified ring access connection message including the first network resource locator, in response to the modified ring access message and for representing the modified ring access connection message by an FSK message, a central office switch operable to establish a connection to the subscriber telephone in response to the modified ring access connection message and for transmitting the FSK message to the subscriber telephone, a first network resource operable to provide the file to the subscriber telephone and a remotely configurable subscriber telephone operable to receive the FSK message and to download the file from the first network resource in response to the first uniform resource locator.

21 Claims, 16 Drawing Sheets

F/S = FLASH FILE
JVM = JAVA VIRTUAL MACHINE
RTX = REAL TIME XSERVER

COMMUNICATING NETWORK RESOURCE LOCATORS TO CUSTOMER PREMISES EQUIPMENT USING MODIFIED RING ACCESS

FIELD OF THE INVENTION

This invention relates to the use of modified ring access to convey a network resource locator to a telephone and use of the telephone to download resources which may include applets, instruction files or content files from the network resource identified by the locator.

BACKGROUND OF THE INVENTION

Operating companies need a way to enable telephones to get information on a periodic basis. Existing SRA access for transmissions of such information involves the transmission of data using FSK which is very slow and is not reliable for large amounts of data. This method uses a short FSK blast which instructs the phone to navigate to the web using a high speed modem. The modem connection is a reliable high speed connection which can be used to download the large amount of data which is intended to be downloaded.

The use of raw FSK data for the transfer of advertising control files, for example, is too slow and unreliable. Consequently, previous implementations of display based marketing only allowed text information to be displayed on the telephone.

Proprietary graphic standards could be developed to permit graphic data to be transmitted but this would require special tools to be distributed to the information providers.

What would be desirable would be the use of internet standard technology to make the development of ads very easy for the providers and to allow features such as animation to be included in advertising content as animated GIFs or as applets. The present invention addresses this need.

SUMMARY OF THE INVENTION

In accordance with one aspect of the invention, there is provided a method and system for communicating a network resource locator to a subscriber telephone. The system includes a modified ring access server for producing a modified ring access message including a first network resource locator identifying a first network resource.

The system further includes a central office service unit for producing a modified ring access connection message including the first network resource locator, in response to the modified ring access message. Preferably, the modified ring access connection message is represented by an FSK message.

The system further includes a central office switch operable to establish a connection to the subscriber telephone in response to the modified ring access connection message and for transmitting the FSK message to the subscriber telephone.

The system further includes a first network resource operable to provide to the subscriber telephone a first applet including a second network resource locator identifying a second network resource.

Preferably, the system further includes a second network resource operable to provide a content file to the subscriber telephone.

In accordance with another aspect of the invention, there is provided a method and system for downloading a file to a subscriber telephone. The system includes a modified ring access server for producing a modified ring access message including a first network resource locator, a central office service unit for producing a modified ring access connection message including the first network resource locator, in response to the modified ring access message and for representing the modified ring access connection message by an FSK message, a central office switch operable to establish a connection to the subscriber telephone in response to the modified ring access connection message and for transmitting the FSK message to the subscriber telephone, a first network resource operable to provide the file to the subscriber telephone and a remotely configurable subscriber telephone operable to receive the FSK message and to download the file from the first network resource in response to the first uniform resource locator.

Preferably, the first network resource provides to the telephone a first applet including a second network resource locator identifying a second network resource.

Preferably, the system includes a second network resource operable to provide a file to the subscriber telephone.

Preferably, the telephone is operable to establish communications with the first network resource to receive the applet from the first network resource in response to the first uniform resource locator in the FSK message and preferably, the telephone is operable to establish communication with the second network resource and to download the file from the second network resource in response to the second uniform resource locator extracted from the applet.

Preferably, the remotely configurable telephone has a processor operable to communicate on the network and memory accessible by the processor for storing codes operable to direct the processor to perform the functions of a browser for downloading from the first network resource, the applet including the second network resource locator, an applet viewer for running the applet, a public interface for communicating with the applet to receive the second network resource locator from the applet, a security manager for preventing running applets from accessing the memory and a handler having access to the memory, the handler being in communication with the public interface, for communicating with the second network resource identified by the second network resource locator to receive and store in the memory, the file from the second network resource.

Preferably, the handler is operable to decompress the file from the second resource to produce a plurality of decompressed files.

Preferably, the handler is operable to verify the file has been received in accordance with predefined criteria.

Preferably, the handler is operable to extract a password from the file and compare the password against a predefined password and to store the file in the memory when the password matches the predefined password.

Preferably, the handler is operable to extract a filename from the file from the second network resource and load the file into an area of memory associated with the filename.

Preferably, the system includes an FSK receiver in the telephone for receiving an FSK message having a first network resource locator identifying the first resource and preferably, the web browser is operable to receive the first network resource locator from the FSK receiver.

Preferably, the system includes a first telephone line interface at the telephone for receiving an FSK message from a first telephone line and for providing the FSK message to the FSK receiver.

Preferably, the system includes an event parser at the telephone for extracting the first network resource locator from the FSK message for presentation to the web browser.

Preferably, the system includes a second telephone line interface at the telephone, the processor using the second telephone line interface for communicating on the network.

In accordance with another aspect of the invention, there is provided a system and method for displaying advertising on a telephone. The system includes a processor for executing an instruction file at the telephone, a communications interface controlled by the processor for establishing communications between the processor and a network resource identified by the instruction file, a display controlled by the processor and a browser running on the processor the browser being operable to download and execute an advertising content file from the network resource to produce an image on the display.

Preferably, the system includes memory in communication with the processor for storing the instruction file at the telephone.

Preferably, the processor is operable to execute the instruction file in response to a predefined event at the telephone.

Preferably, the system includes an FSK receiver in communication with the processor, for receiving a network resource locator in an FSK message, the network resource locator identifying a network resource from which the instruction file may be downloaded.

Preferably, the browser is operable to execute an applet in the instruction file.

Preferably, the browser defines a browser window on the display, the browser window occupying substantially an entirety of the display such that the displayed contents of the advertising content file are substantially unobstructed by the browser.

In more general terms, far end party equipment sends to a target telephone an onhook FSK message which includes the target phone's identification and a URL to navigate to. The target telephone decodes the FSK message to extract the URL and establishes a high speed modem connection to the internet using the data line. A built in browser in the telephone is then instructed to navigate to the URL and start an applet. The applet is responsible to initiate the download process of a file from a second network resource.

Effectively, this invention extends the existing suppressed ring access technology to include a URL navigation instruction to a Java capable telephone. This instruction prompts the telephone to initiate an ISP connection and navigate to the given URL. The resource specified by the URL contains a Java applet which is designed to run without any user interaction and can be used to query and update software in the target telephone to enhance or provide services, change configurations and/or provide display based marketing. This invention is useful for operating companies to manage Java capable screen phones deployed in their territory.

With the use of the invention an ad or advertising content file is developed as an HTML page and can be tested on a PC using a standard web browser. An instructions file is also developed to instruct the phone as to what to do with the information in the ad such as what HTML page is to be used, when should the ad be displayed, and where to navigate when the ad is selected.

The advertising content file is bundled in a zip file and placed on a web server to be picked up by the phone.

The telephone is instructed to pick up the ad bundle through the use of the instruction file. The telephone may be instructed to navigate to a resource containing the instruction file through a game, a service, a timer on the telephone or through the use of SRA to force the telephone to navigate to the applet when the phone is idle.

This invention allows high resolution pictures and animation to be displayed on an idle telephone for marketing purposes. The use of HTML and applets in a browser enable the advertisement to incorporate any HTML construct including text, high resolution pictures and animation. The browser has no navigation tools or buttons so that the advertisement is unobstructed. When the advertisement is selected by the user, the browser automatically navigates to a site associated with the advertisement, where more information can be provided for the user. The site could be in permanent storage on the phone for quick access or could be on the internet which would require the phone to automatically connect to an ISP.

BRIEF DESCRIPTION OF THE DRAWINGS

In drawings which illustrate embodiments of the invention.

DETAILED DESCRIPTION

FIG. 1

Figure 1:
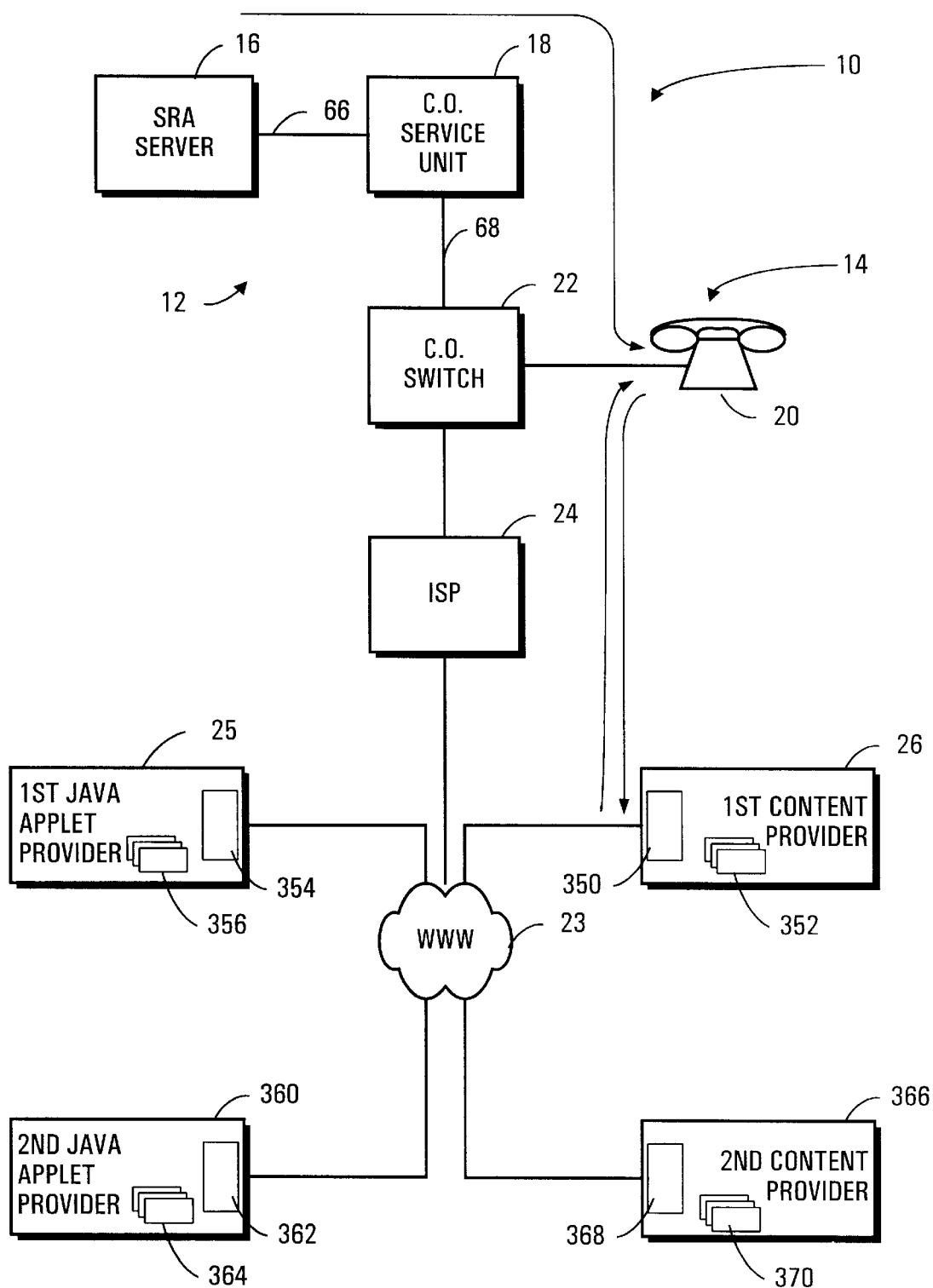
FIG. 1 is a schematic diagram of a system according to a first embodiment of the invention.

Referring to FIG. 1, a system for communicating a network resource locator to a telephone and for downloading a file to a telephone is shown generally at 10.

The system includes a network including a first network node 12 which includes a modified ring access (SRA) server 16 and a central office service unit 18 and a second network node 14 which includes a remotely configurable telephone 20. The modified ring access server 16 is in communication with the central office service unit 18 and the central office service unit is in communication with the telephone through a central office switch 22 in the public switched telephone network.

In addition to providing conventional telephone features, the telephone 20 receives FSK messages including a network resource indicator, through modified ring access such as suppressed ring access or single ring access initiated by the SPA server 16 and central office service unit 18. The telephone 20 also has transceiver hardware and software for establishing communications with an internet service provider 24, through the central office switch 22 to establish communications with a first Java applet provider 25 which acts as a first network resource identified by a second network resource indicator included in the FSK message provided to the telephone by the central office service unit 18. The SRA server thus directs the telephone 20 to the first network resource from which it can download Hypertext Markup Language (HTML) pages. Such HTML pages may include applets which can be run at the telephone 20 to direct the telephone to communicate with a first content provider 26 which can provide files to re-configure the telephone to change the functionality thereof to display content such as advertising or to provide enhanced telephone features.

FIG. 2

SRA server

Figure 2:
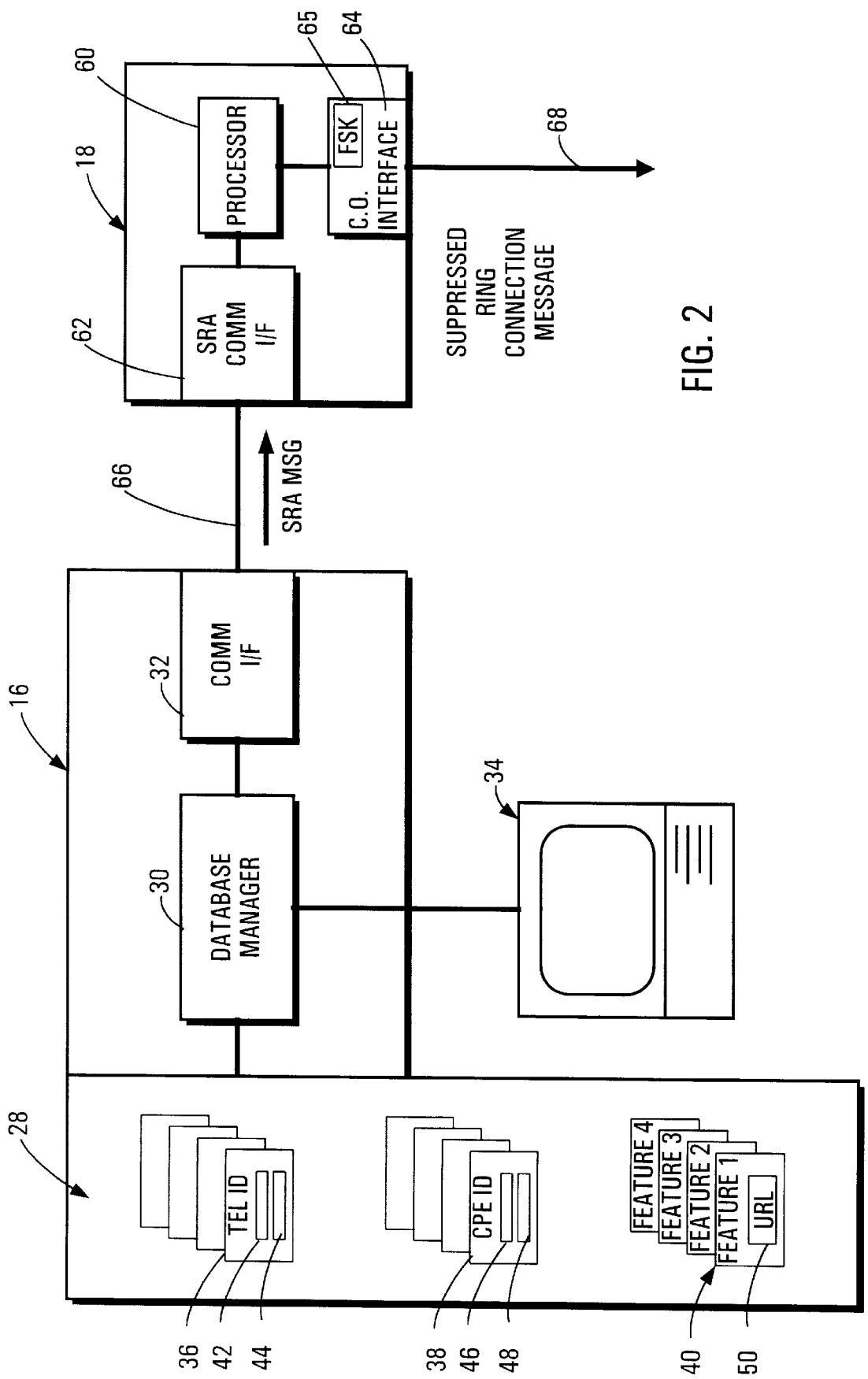
FIG. 2 is a block diagram of a suppressed ring access (SRA) server and a central office service unit according to the first embodiment of the invention.

Referring to FIG. 2, the SRA server 16 includes a database shown generally at 28, a database manager 30, a communications interface 32 and an administrator terminal 34. The database 28 is used to store a plurality of records including telephone number records 36, customer premises equipment identification (CPE ID) records 38 and feature records 40.

The telephone number records 36 have telephone number fields 42, and subscriber information fields 44 while customer premises equipment records 38 have telephone number fields 46 and CPE ID fields 48. The contents of the telephone number fields 42 and 46 link telephone number records and CPE ID records together when the telephone number fields 42 and 46 have the same contents.

The feature records 40 have respective URL fields 50 for storing a network resource locator which in this embodiment is a uniform resource locator identifying a network resource on the world-wide web at which an HTML page including a download applet is available. In this embodiment, the URL fields are loaded with respective URLs identifying respective HTML pages 356 at the applet provider 25. The download applet is runable by the telephone 20 to provide the telephone with the functionality required to download a feature applet from the same network resource or a different network resource.

The database manager 30 receives commands from the administrator terminal 34 to create and amend telephone number records 36 and CPE ID records 38 in the database 28. A separate telephone number record is associated with each telephone and therefore in this embodiment, telephone number record 36 is associated with telephone 20 shown in FIG. 1. A CPE ID record is also associated with telephone 20, and has a CPE ID field 48 identifying an address of an equipment block within the telephone. This facilitates a plurality of different equipment to be connected to the same telephone line from the central office switch (22), while allowing each different equipment to be individually addressable.

In one scenario, the SRA server 16 is maintained by a telephone company providing telephone services to subscribers such as the user of telephone 20. The database records are created such that separate telephone number records are associated with respective corresponding subscriber lines and separate equipment ID records 38 are associated with respective corresponding equipment connected to a given line, at the subscriber's premises.

In the event that a user requests a change in telephone features, an administrator enters the change into the administrator terminal 34 which directs the database manager 30 to search the telephone number records and CPE ID records to locate the user's telephone number and CPE ID for the telephone which is to be changed to include the new telephone features. At the same time, the database manager 30 searches the feature records 40 to locate a record containing a uniform resource locator (URL) defining an address of a resource on the internet at which an HTML page including an applet which provides a URL identifying a resource from which the telephone downloads a file using a file transfer protocol (FTP), the file being executable by the telephone to provide extended functionality thereto.

FIG. 3

Figure 3:
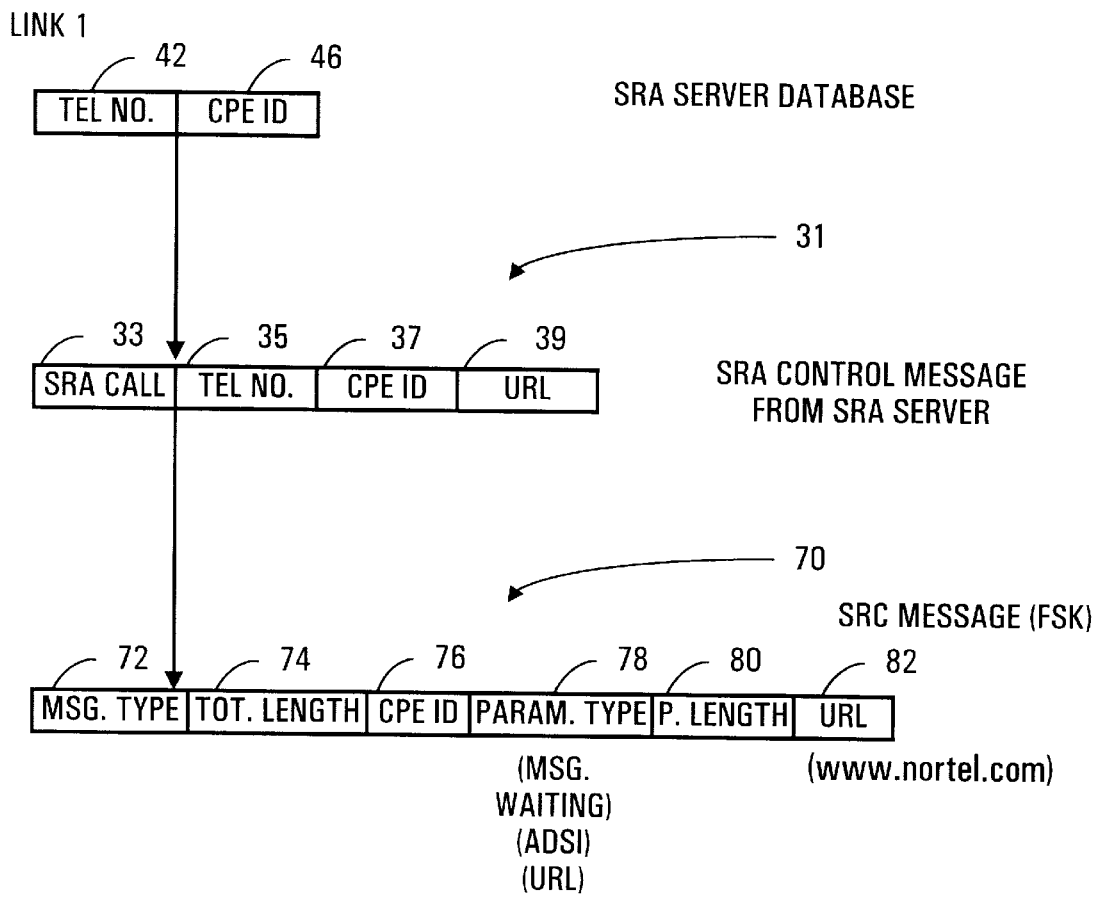
FIG. 3 is a schematic representation of an SRA control message and an SRC message transmitted by the SRA server and the central office service unit respectively.

In response to the database search, the database manager produces an SRA control message as shown at 31 in FIG. 3, including a message identifier 33 identifying the type of loop carrier in the connecting path to the subscriber location, a telephone number of a subscriber line 35, a CPE ID 37 identifying equipment on the subscriber line to which the SRA control message is addressed, and a URL 39 copied from the uniform resource locator field 50 of the feature record 40. Referring back to FIG. 2, this SRA control message is provided to the communication interface 32 which transmits it to the central office service unit 18. The SRA server thus acts as a modified ring access server, or means for producing a modified ring access message including a first network resource locator identifying a first network resource. In this embodiment, the first network resource is an HTML page at the first Java applet provider 25.

Central Office Service Unit

Still referring to FIG. 2, in this embodiment, the Central Office service unit 18 includes a telemetry network access computer 60, an SRA communications interface 62 and a central office interface 64 including an FSK transmitter 65. The SRA communications interface 62 is connected to the communications interface 32 of the SRA server 16 by a public packet switched network link 66 and provides messages received from the SRA server 16 to the telemetry network access computer 60. The FSK transmitter 65 in the central office interface 64 is controlled by the telemetry network access computer 60 and is connected to the central office (not shown in FIG. 2) by at least one trunk 68 having a suppressed ring access class of service.

In general, the telemetry network access computer 60 receives SRA messages from the SRA server 16 and produces on the trunk 68 suppressed ringing connection (SRC) messages in an FSK format, as shown generally at 70 in FIG. 3. Thus, the central office service unit produces a modified ring access connection message in an FSK format, including the first network resource locator in response to the modified ring access message. The FSK transmitter acts as means for representing the modified ring access connection message by an FSK message.

Referring back to FIG. 3, SRC messages have a format which includes a message type field 72, a total length field 74, a CPE ID field 76, a parameter type field 78, a parameter length field 80, and a parameter data field 82. The message type field identifies the message as a suppressed ring connection message. Predefined codes are used to identify predefined message types. The total length field 74 is used to hold a value representing the total length of the SRC message. The CPE ID field 76 is loaded with the contents of the CPE ID field 37 of the SRA control message from the SRA server. The parameter type field 78 is used to identify the type of data stored in the parameter data field 82 and, in this embodiment, the parameter type field stores a predefined code representing that the contents of the parameter data field 82 relate to URL data. The parameter length field 80 is used to identify the length of the parameter data field 82. The parameter data field 82 is, in this embodiment, used to store the uniform resource locator from the URL field 39 of the SRA control message from the SRA server.

FIG. 4

Central Office Switch

Figure 4:
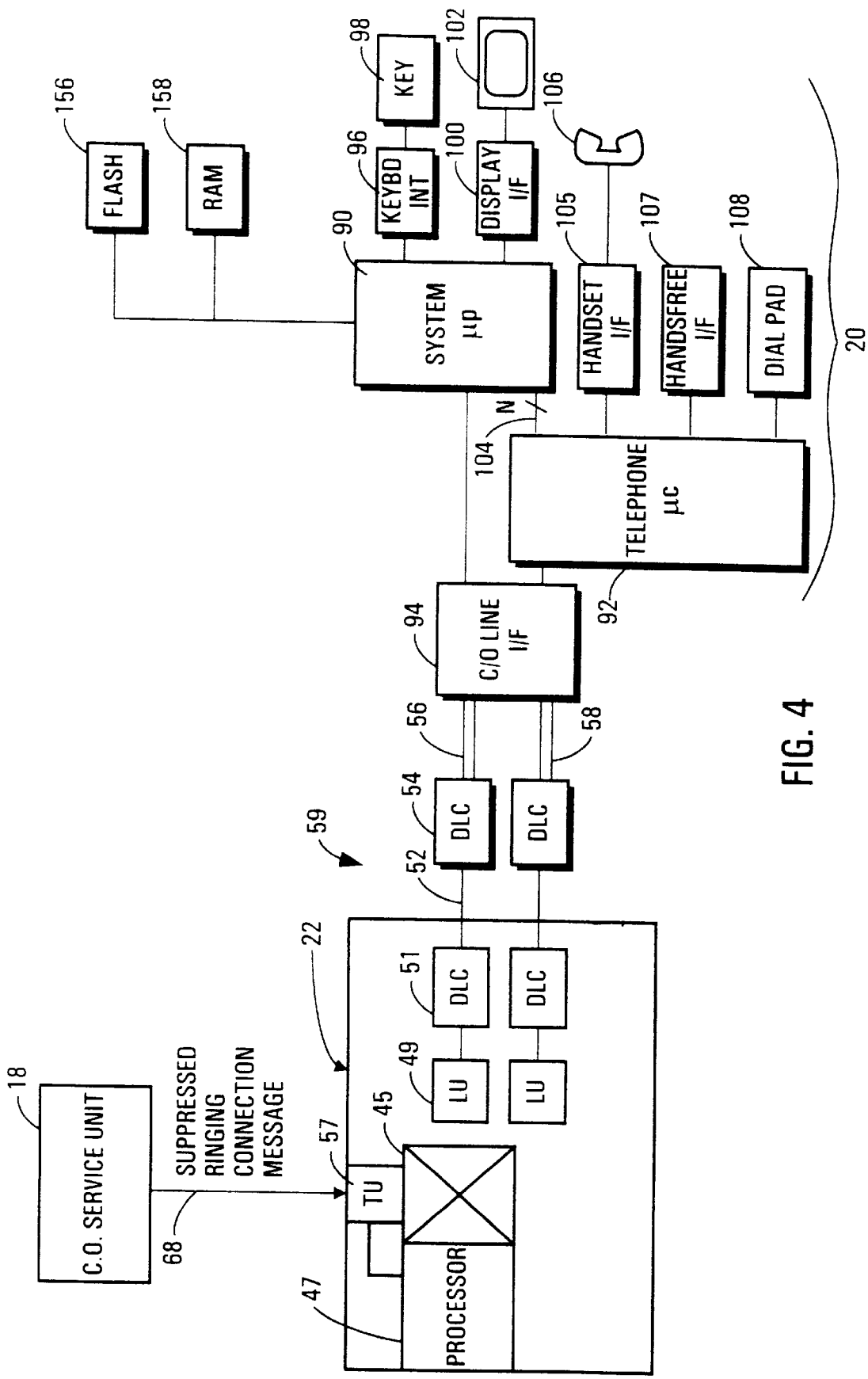
FIG. 4 is a schematic representation of a central office and a telephone according to the first embodiment of the invention.

Referring to FIG. 4, the central office switch 22 includes a program driven digital switch including a switching network 45, a program controlled processor 47 a trunk unit 57 and a plurality of subscriber interfaces, only two of which are shown at 59 and 61.

The trunk unit 57 senses activation by the central office service unit and signals the program controlled processor 47, to indicate such activation. The program controlled processor then controls the switching network 45 to provide voice path connections for communicating suppressed ring access messages from the central office service unit 18 to subscriber locations such as the telephone 20 served by the central office switch 22. Communication between each subscriber location and the switching network 45 occurs via the subscriber interfaces, each of which includes a line unit 49, a digital loop carrier 51 at the switch location, a transmission path 52, a digital loop carrier 54 at a remote location and a subscriber line 56, 58. Thus, the central office service unit and central office act as means for transmitting the modified ring access message to the subscriber telephone 20.

Generally, the trunk 68 has a class of service which identifies to the central office switch 22 that the connections being requested by the central office service unit 18 are to be made with ringing suppressed, ie., with no ringing signal transmitted or with a burst of ringing signal transmitted of sufficient length to activate the digital loop carriers 51 and 54 but of insufficient length to be present for any significant time after connection is completed. Accordingly, the central office service unit 18 can establish connections through the central office switch 22 to the subscriber locations, and such connections are accompanied by no or little (ie., short) ringing. These connections facilitate the transmission of suppressed ring access messages in an FSK format to the telephone. In other words, the central office service unit 18 places a call through the central office on a trunk line having a special class of service. The central office detects that a call is being made on the special trunk line and activates the digital loop carriers for the line to which the call is being made, to enable communication between the central office service unit and the telephone, without activation (suppressed ringing) or with minium activation (single ring) of ring tone generation circuitry (not shown) in the central office. Thus, a communication link is established between the central office service unit 18 and the telephone to permit the FSK suppressed ring access message to be transmitted from the central office service unit to the telephone. Thus, the central office switch is operable to establish a connection to the subscriber telephone in response to the modified access connection message and acts as means for communicating the modified ring access connection message to the subscriber telephone. The modified access connection message is transmitted as an FSK message to the subscriber telephone and thus, the central office acts as means for transmitting the FSK message to the subscriber telephone.

To this point, therefore, there has been described a method and system for communicating a network resource locator to a subscriber telephone, involving producing a modified ring access message including a first network resource locator identifying a first network resource and transmitting said modified ring access message to said subscriber telephone.

Telephone

Referring to FIG. 4, the telephone acts as a remotely configurable subscriber telephone and is shown generally at 20 and includes a system microprocessor 90, a telephony microcontroller 92, and a central office line interface 94 in communication with both the system microprocessor 90 and the telephony microcontroller 92. The system microprocessor is connected to a keyboard interface 96 and a keyboard 98, for receiving user input for commanding the system microprocessor 90 to effect certain functionality. The system microprocessor is further connected to a display interface 100 which is further connected to a display 102, for displaying output to a user.

The telephony microcontroller 92 is in communication with the system microprocessor 90 by a plurality of signal lines 104 and is further in communication with a handset interface 105 for controlling signals to and from a conventional handset 106 and a hands-free interface 107 for providing conventional speakerphone functionality to the telephone.

The telephony microcontroller 92 is further in communication with a dial pad 108 of the conventional type, for enabling a user to dial telephone numbers at the telephone.

FIG. 5

Figure 5:
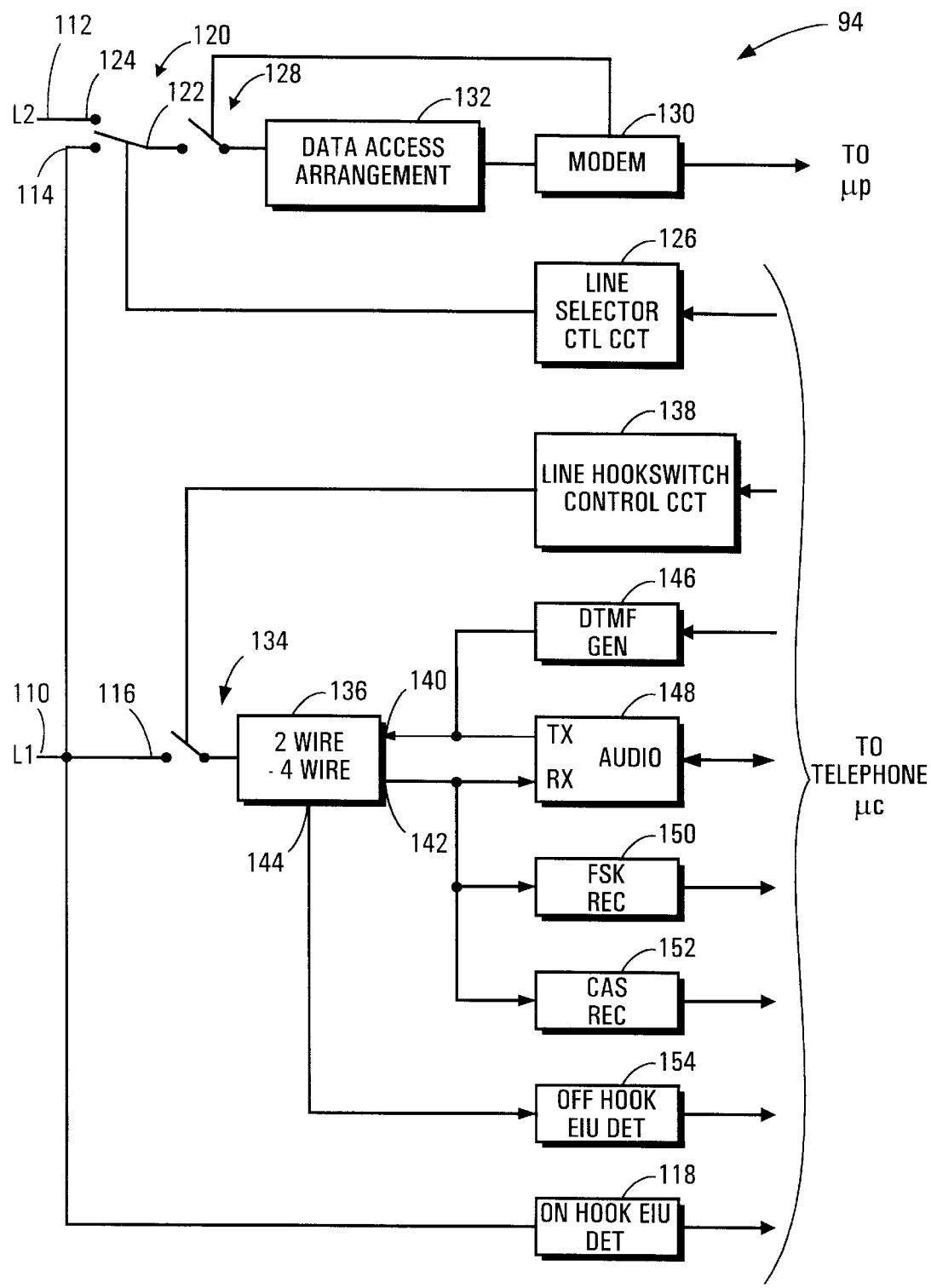
FIG. 5 is a block diagram of a central office line interface in the telephone, according to the first embodiment of the invention.

Referring to FIG. 5, the central office line interface is shown in greater detail at 94. The central office line interface has first and second telephone line inputs 110 and 112 which are connected to the first and second telephone lines 56 and 58 respectively. The first line input 110 is connected to a line 1 modem terminal 114, a two to four wire interface terminal 116 and an on-hook extension in use detector 118. The modem terminal 114 is connected to a line selector switch shown generally at 120 having a selector terminal 122 and a line 2 modem terminal 124. The line selector switch 120 is controlled by a line selector control circuit 126 to connect the selector terminal to either the line 2 modem terminal 124 or the line 1 modem terminal 114. The selector terminal 122 is further connected to a modem hook switch 128 which is controlled by a modem 130 in communication with the system microprocessor 90, shown in FIG. 4.

Referring back to FIG. 5, the modem hook switch 128 is connected to a data access arrangement 132 which isolates the modem from the second telephone line and provides a DC path for seizing the line. The data access arrangement 132 is in communication with the modem 130, to provide analog signals to and from the modem 130, for communication to the system microprocessor. Thus, the system microprocessor is operable to use the modem and second telephone line to communicate on the network and, more particularly, the world-wide web 23.

The central office line interface further includes a line hook switch 134 and a two wire to four wire hybrid circuit 136. The hook switch 134 is controlled by a line hook switch control circuit 138 which opens and closes the hook switch 134 thereby connecting and disconnecting the first telephone line to and from the two to four wire hybrid circuit 136.

The two to four wire hybrid circuit 136 has a transmit input 140 and a receive output 142 and an off-hook detect signal output 144. The transmit input 140 is connected to a DTMF generator 146 and a transmit output of an audio circuit 148. The DTMF generator is operable to provide tones to the transmit input 140 to provide DTMF tones on the first telephone line 56.

The receive output 142 of the two to four wire hybrid circuit 136 is connected to a receive input of the audio circuit 148, and is further connected to an FSK receiver 150 and a caller alerting signal receiver 152.

The off-hook EIU detect output 144 of the two to four wire hybrid circuit 136 is connected to an off-hook EIU detect circuit 154 which provides a signal indicating whether or not an extension is in use on the first telephone line, at the same time that the hook switch 134 is closed.

The on-hook extension in use detector 118 monitors the first telephone line 56 to provide a signal indicating whether or not an extension is in use on the first telephone line, when the hook switch 134 is in the open position.

The line selector control circuit 126, the line hook switch circuit 138 and the DTMF generator 146 are operable to receive signals from the telephony microcontroller 92 shown in FIG. 4, to control the state of the line selector switch 120, to control the state of the line hook switch 134 and to provide DTMF signals to the two to four wire interface for transmission on the first telephone line, respectively. The audio circuit 148 is in bi-directional communication with the telephony microcontroller which effectively provides an audio path, with audio signal processing to the handset interface 105 or hands-free interface 107 shown in FIG. 4.

The FSK receiver 150, caller alerting signal receiver 152, off-hook EIU detect circuit 154 and on-hook extension in use detector 118 provide FSK, CAS, off-hook EIU and on-hook EIU signals respectively to the telephony microcontroller.

Figure 6:
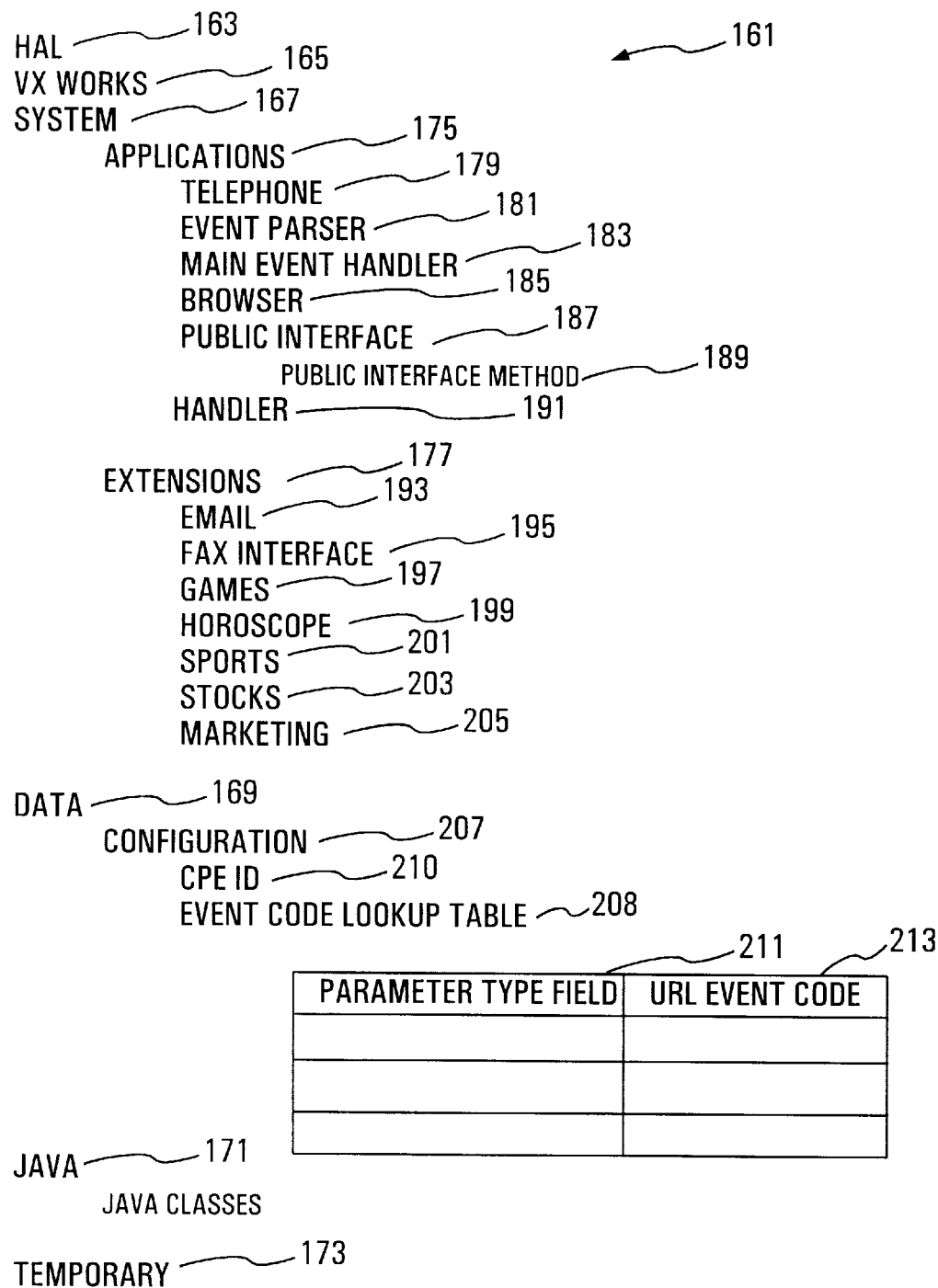
FIG. 6 is a tree diagram of a directory structure of file directories within the telephone.

Referring back to FIG. 4, the system microprocessor 90 is further in communication with FLASH memory 156 accessible by the system microprocessor for storing codes operable to direct the processor to perform the functions of a browser, an applet viewer, a public interface, a security manager and a handler. The microprocessor is further in communication with random access memory (RAM) 158.
FIG. 6

Referring to FIG. 6, the FLASH memory holds a directory structure as shown generally at 161. The directory structure includes a base directory having a hardware abstraction layer file 163, an operating system file 165, a system subdirectory 167, a data subdirectory 169, a Java subdirectory 171 and a temporary subdirectory 173.

The hardware abstraction layer file 163 includes basic boot commands for booting up the system processor and for directing it to load the operating system file 165 into RAM, where it is run by the processor.

The operating system file 165 contains operating system commands for establishing basic operation of the system microprocessor 90. The operating system commands include a Board Support Package (BSP) and drivers which direct the processor to interact with the central office line interface 94, the telephony microcontroller 92, the keyboard interface 96 and the display interface 100 shown in FIG. 4. In this embodiment, the operating system is known as VX Works (tm) provided by Windriver of Alameda, Calif. The operating system maintains a routing table 155 in the RAM 158 shown in FIG. 4 for maintaining details of connections established through the central office line interface 94 on the second subscriber line 58 shown in FIG. 4.

The operating system file further includes code implementing a Java (tm) virtual machine and a graphics layer known as RTX X-Windows server (tm) by Visicom of San Diego, Calif. The Java virtual machine includes core Java packages including Java.lang, Java.io, Java.applet, Java.net and Java.awt which in connection with the operating system files create a Java run time environment at the system microprocessor 90.

Still referring to FIG. 6, the system subdirectory 167 includes an applications subdirectory 175 and an extensions subdirectory 177. The applications subdirectory 175 includes a telephone subdirectory 179 containing files for directing the system microprocessor 90 to cooperate with the telephony microcontroller 92 to provide telephony functionality. The applications subdirectory further includes an event parser subdirectory 181 containing event parser files, a main event handler subdirectory 183 containing main event handler files, a browser subdirectory 185 containing browser files, a public interface subdirectory 187 containing public interface method files 189 and a handler subdirectory 191 containing handler files.

The extensions subdirectory 177 includes an email subdirectory 193 containing email files for providing email functionality, a fax interface subdirectory 195 containing fax files for providing fax functionality, a games subdirectory 197 containing game files for providing game functionality, a horoscope subdirectory 199 containing horoscope files for communicating with horoscope content providers, a sports subdirectory 201 containing sports provider files for communicating with sports information providers, a stocks subdirectory 203 containing stock provider communication files for communicating with stock information providers and a marketing subdirectory 205 containing marketing files for providing display advertising on the display 102.

The data subdirectory 169 includes a configuration data subdirectory 207 containing configuration files including a CPE ID file 210 and an event code lookup table file 208. The CPE ID file 210 holds a CPE ID of the telephone, to identify the telephone from other telephones which may be connected to the same telephone line. The event code lookup table file 208 contains an event code lookup table having parameter type and URL event code fields 211 and 213 respectively, for associating parameter types with URL event codes.

The Java subdirectory 171 includes Java class files of the type classes.jar.

Figure 7:
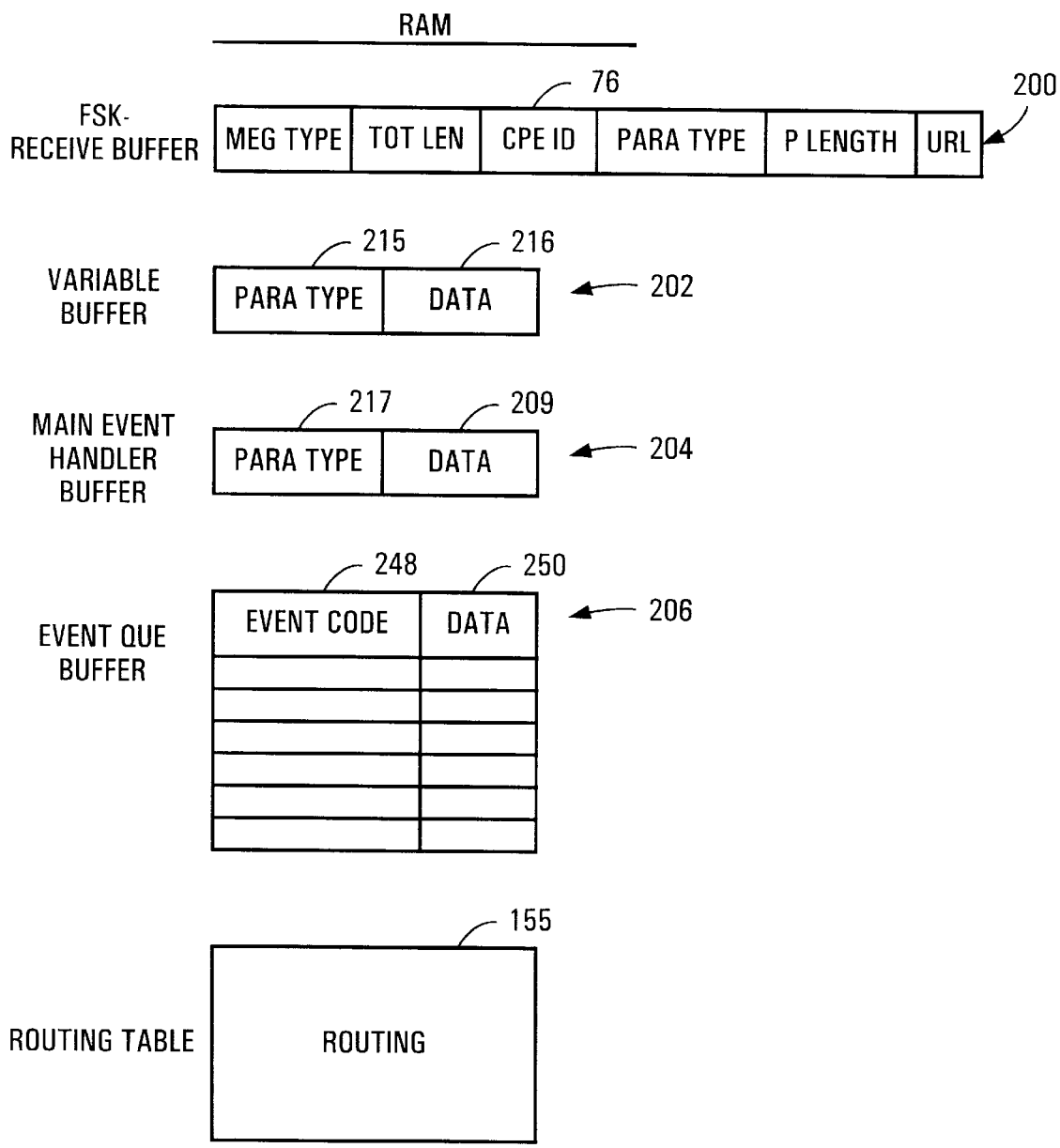
FIG. 7 is a schematic representation of storage areas in the RAM shown in FIG. 4.

The temporary subdirectory 173 is used to store applets, HTML pages and files which may be downloaded over one of the analog subscriber lines 56 and 58 shown in FIG. 4.
FIG. 7

Referring to FIG. 7, the RAM 158 is used to maintain an FSK receive buffer 200, a variable buffer 202, a main event handler buffer 204, an event queue buffer 206 and a routing table 155.

The FSK receive buffer 200 is of sufficient length to receive FSK messages, in general. Such messages may include caller ID information and the like and, more particularly, such messages may include SRC messages sent by the central office service unit 18 shown in FIG. 1.

Figure 8:
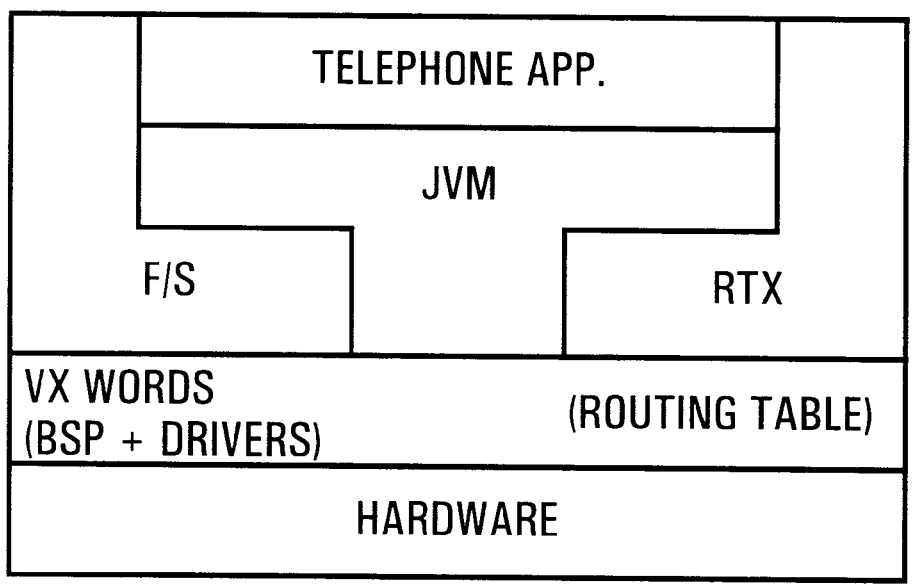
FIG. 8 is a schematic representation of program architecture in a processor in the telephone, according to the first embodiment of the invention.

The variable buffer 202 and the main event handler buffer 204 hold variable and main event records respectively. The variable records include a parameter type field 215 and a data field 216 and the main event records include a parameter type field 217 and a data field 209. The event queue buffer 206 is a variable length buffer for storing various event queue records, each of which includes an event code field 248 and a data field 250.
FIG. 8

Referring briefly to FIG. 4, the system microprocessor 90, FLASH memory 156, and RAM 158 together form a computer architecture. Referring to FIG. 8, this architecture is shown generally at 162.

FIG. 9

Figure 9:
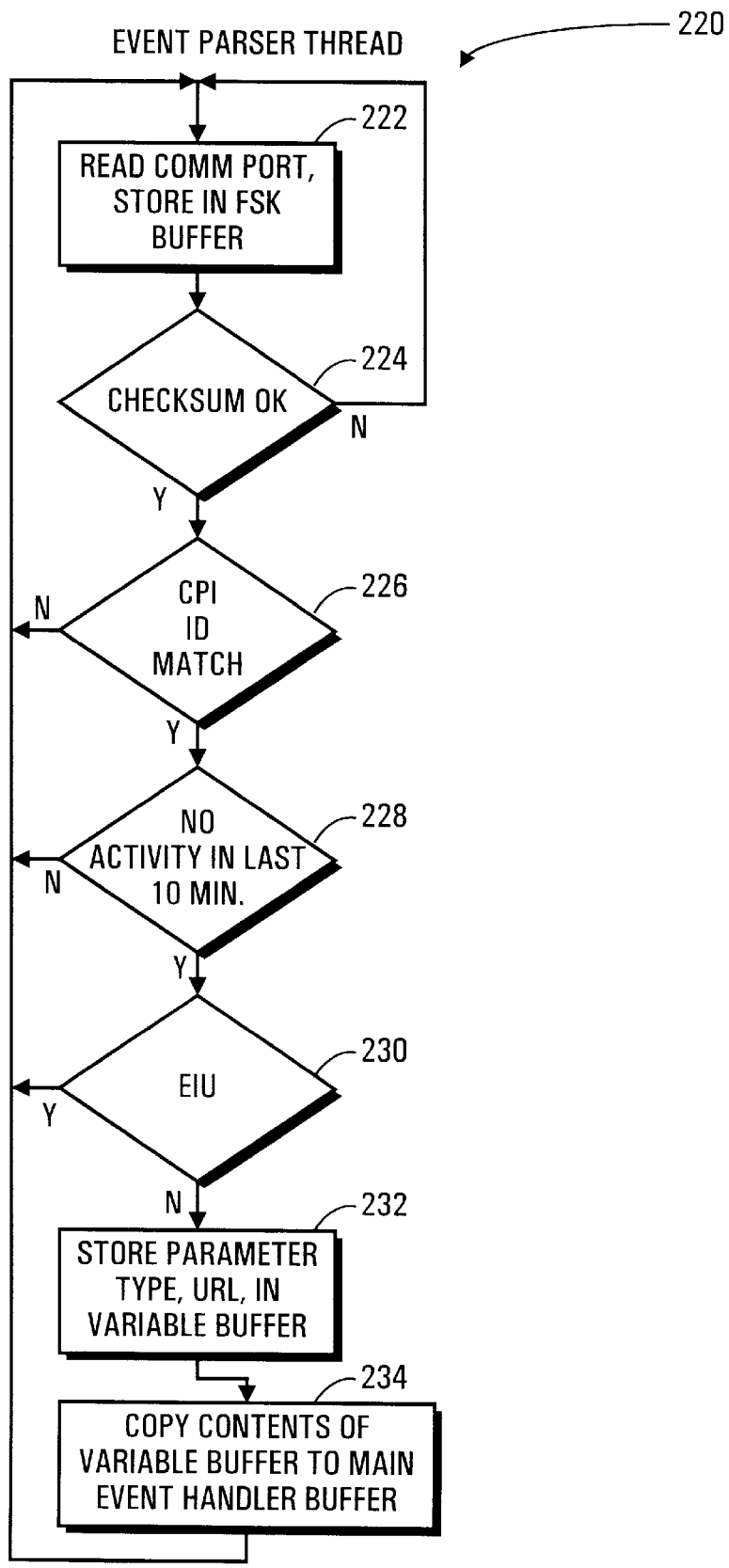
FIG. 9 is a flowchart of an event parser thread run by a system processor of the telephone.

Referring to FIG. 9, the event parser files in the event parser directory establish an event parser thread as shown generally at 220. The event parser thread includes a read comm port instance 222 which directs the system microprocessor 90 shown in FIG. 4, to communicate with the telephony microcontroller to read the FSK receiver 150 to determine whether or not an FSK message is being received at the FSK receiver 150. If a message is not being received, the event parser thread is blocked on the read comm port instance 222. If the FSK receiver 150 is receiving an FSK message, such message is passed to the system microprocessor and stored in the FSK receive buffer 200. The system microprocessor, FSK receiver and event parser files thus cooperate to act as a receiver, or means for receiving the FSK message at a remotely configurable subscriber telephone. In other words, the FSK receiver acts as means for receiving an FSK message having a first network resource locator, identifying the first resource from the first telephone line and the system microprocessor and event parser files act as means for receiving the first network resource locator from the FSK receiver.

The event parser thread then includes a checksum instance 224 which directs the processor to read the contents of the FSK receive buffer 200 to determine whether or not the message was received properly. If the message was not received properly, it is ignored and the processor is directed back to the read comm port instance 222.

If the message was received properly, the processor is directed to a CPE ID match instance 226 in which the contents of the CPE ID register 210 stored in the FLASH memory 156 is compared against the contents of the CPE ID field of the FSK message stored in the FSK receive buffer 200. If the CPE IDs do not match, the processor is returned to the read comm port instance 222.

If the CPE IDs match, a no activity instance 228 directs the processor to determine whether or not a user has initiated any activity at the telephone within the last ten minutes.

If the user has not made use of the telephone within the last ten minutes an EIU instance 230 directs the system microprocessor 90 to communicate with the telephony microcontroller 92, causing it to determine whether or not the EIU signal provided by either of the EIU detectors 118 and 154 shown in FIG. 5, indicates that an extension is in use. If so, then the processor is directed back to the read comm port instance 222. If an extension is not in use, then the processor is directed to a store parameter type instance 232 which directs the processor to store the contents of the parameter type field and the contents of the data field, ie., the first network resource locator, in the variable buffer 202. The system microprocessor 90 is then directed to a copy instance 234 which directs it to copy the contents of the variable buffer 202 to the main event handler buffer 204. The processor is then returned back to the read comm port instance 222 where it blocks until a further FSK message is received.

FIG. 10

Main Event Handler Thread

Figure 10:
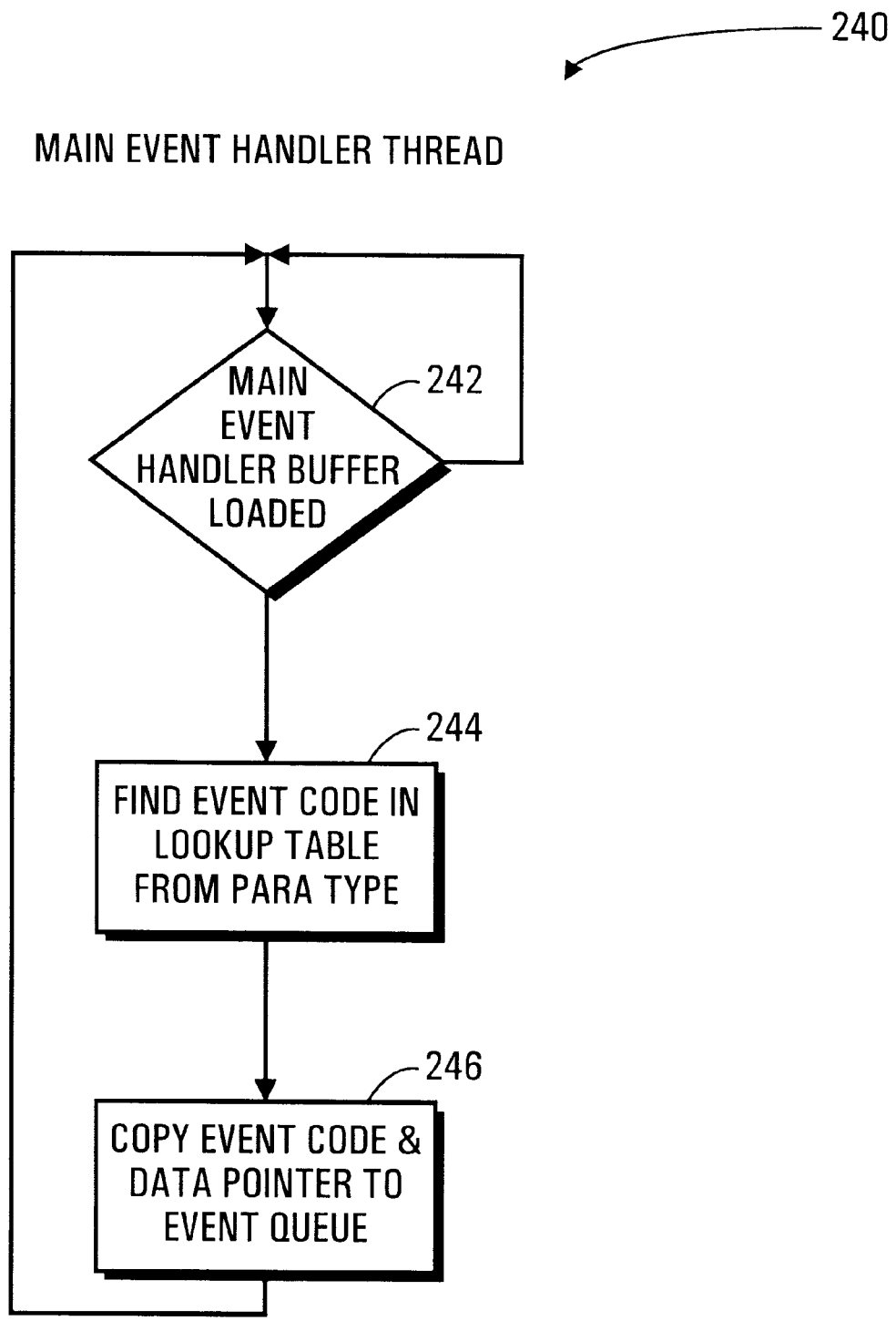
FIG. 10 is a flowchart of a main event handler thread run by the system processor of the telephone.

Referring to FIG. 10, the main event handler files in the main event handler subdirectory 183 establish a main event handler thread as shown generally at 240. The main event handler thread includes a buffer loaded instance 242 which directs the system microprocessor 90 to determine whether or not the main event handler buffer 204 shown in FIG. 7 is full. If this buffer is not loaded then the processor blocks on the buffer loaded instance 242.

If the main event handler buffer is loaded, the processor is directed to a lookup table instance 244 which directs the processor to find an event code record in the event code lookup table 208 shown in FIG. 6, having parameter type field 211 contents corresponding to the contents of the parameter type field in the main event handler buffer 204 shown in FIG. 7.

On finding such an event code record, the system microprocessor 90 is directed to a copy event code instance 246 which directs the processor to copy the contents of the event code field 213 from the event code record into the event queue buffer 206 shown in FIG. 7 and also to copy the contents of the data field 209 of the main event handler buffer 204 shown in FIG. 7 to the event queue buffer 206 in association with the event code. Thus, the processor stores, in the event queue buffer 206, a first event record including an event code from the event code lookup table 208 and data from the data field 250 of the main event handler buffer 204 shown in FIG. 7.

FIG. 11

Figure 11:
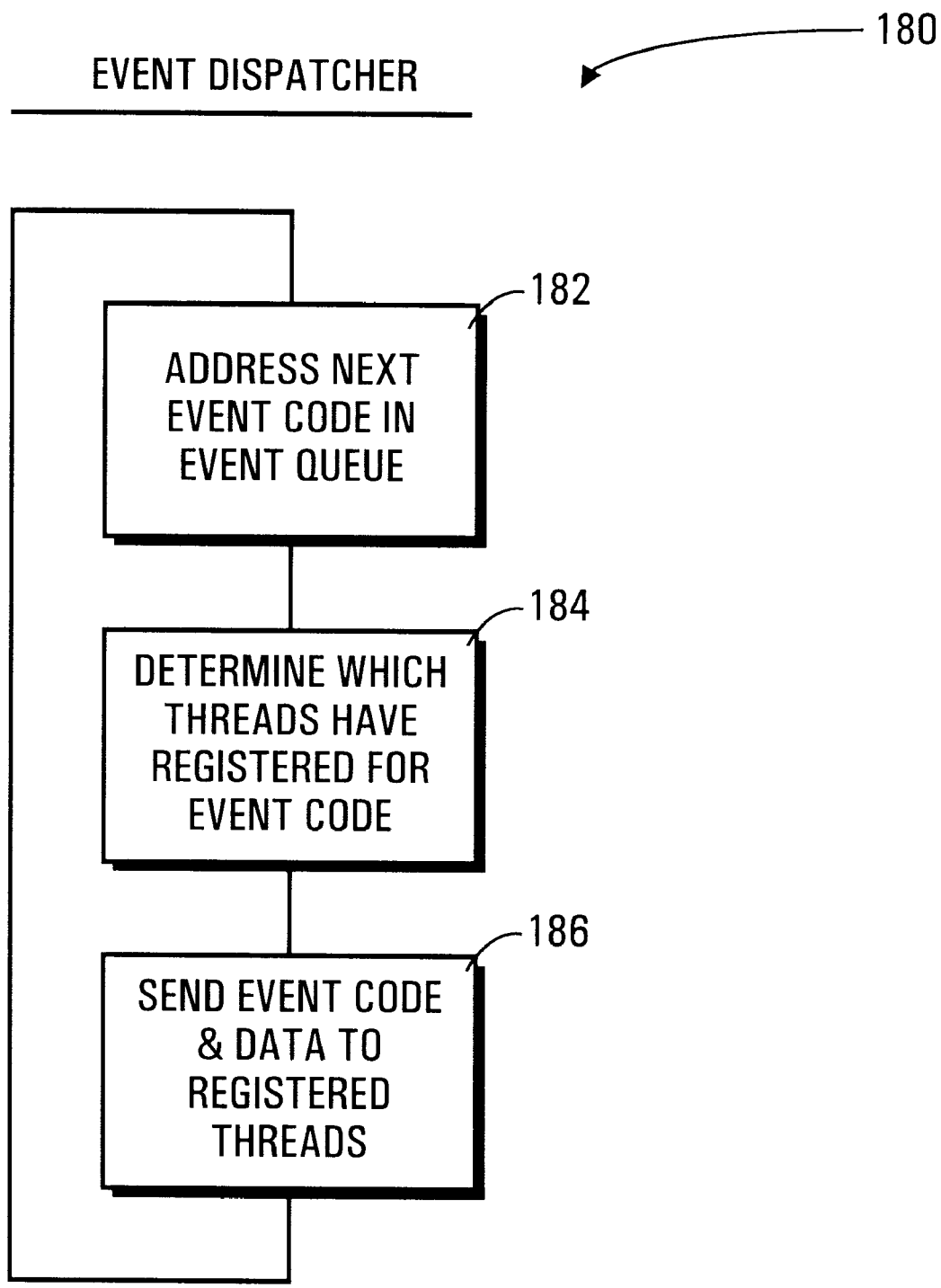
FIG. 11 is a flowchart of an event dispatcher run by the system processor of the telephone.

Referring to FIG. 11, the event dispatcher files in the main event handler subdirectory 183 shown in FIG. 6 establish an event dispatcher thread as shown generally at 180. The event dispatcher thread includes a first instance which directs the system processor to address the next event code record in the event queue buffer 206 shown in FIG. 7. The system processor is then directed to instance 184 which directs it to determine which threads have registered for the event code record addressed at instance 182. The registration of threads with event code records is assumed to have been previously accomplished according to conventional practices. After having determined which threads have registered for the current event code record, instance 186 directs the processor to communicate the current event code record from the event queue buffer 206 to the registered threads. In this manner, data is passed from the event queue buffer 206 to appropriate threads.

FIG. 12

Figure 12:
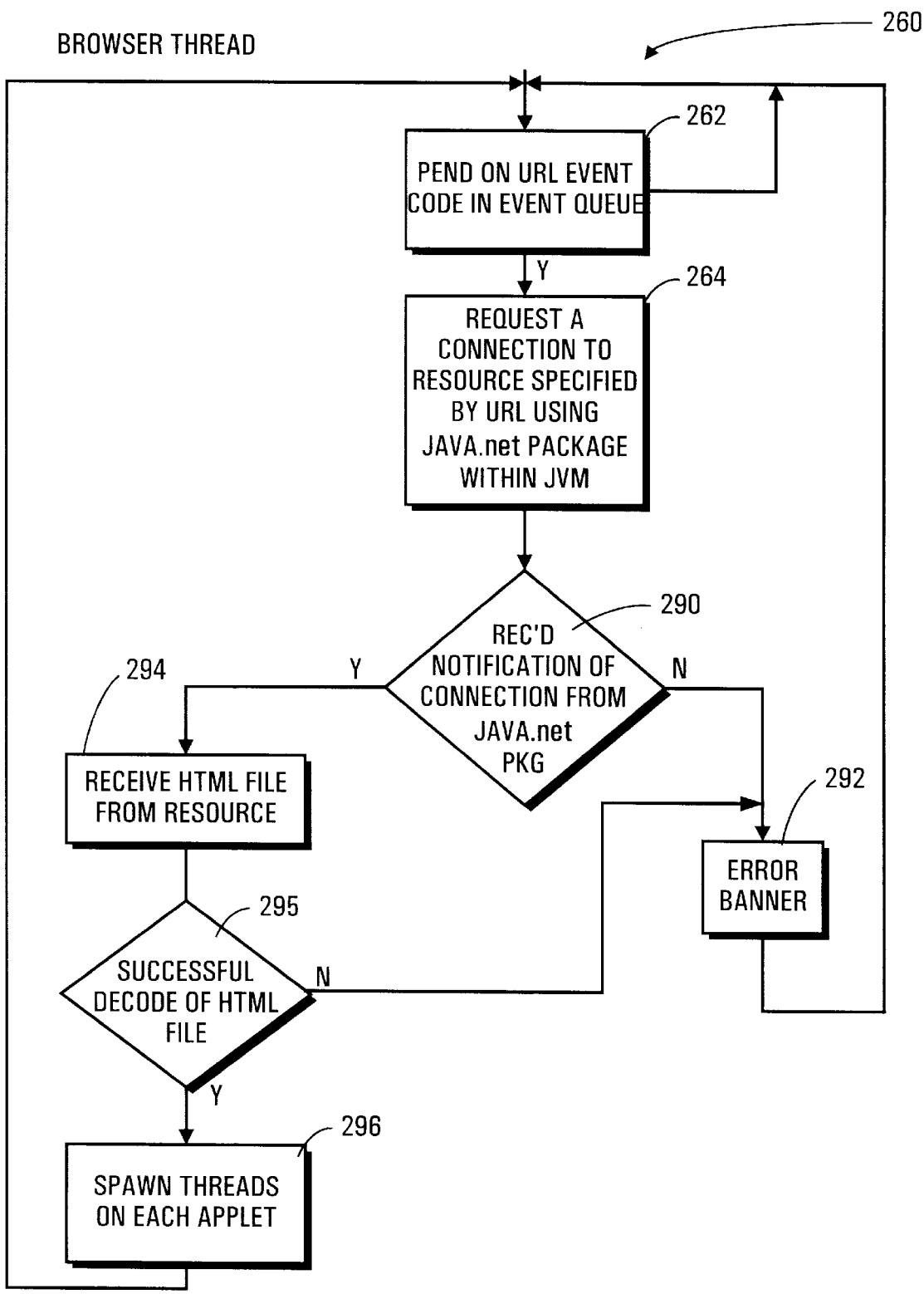
FIG. 12 is a flowchart of the browser thread run by the system processor of the telephone.

Referring to FIG. 12, a browser thread 260 is implemented by the browser files in the browser subdirectory 185 shown in FIG. 6. The browser thread includes a pend instance 262 which directs the processor to pend for receipt of a URL event code record from the event dispatcher thread 180 shown in FIG. 11.

On receipt of a URL event code record, a request instance 264 directs the system microprocessor 90 to request a connection to a world-wide web resource specified by the URL in the data field 250 of the event record. Such connection is requested using classes in the Java net package of the Java virtual machine.

FIG. 13

Figure 13:
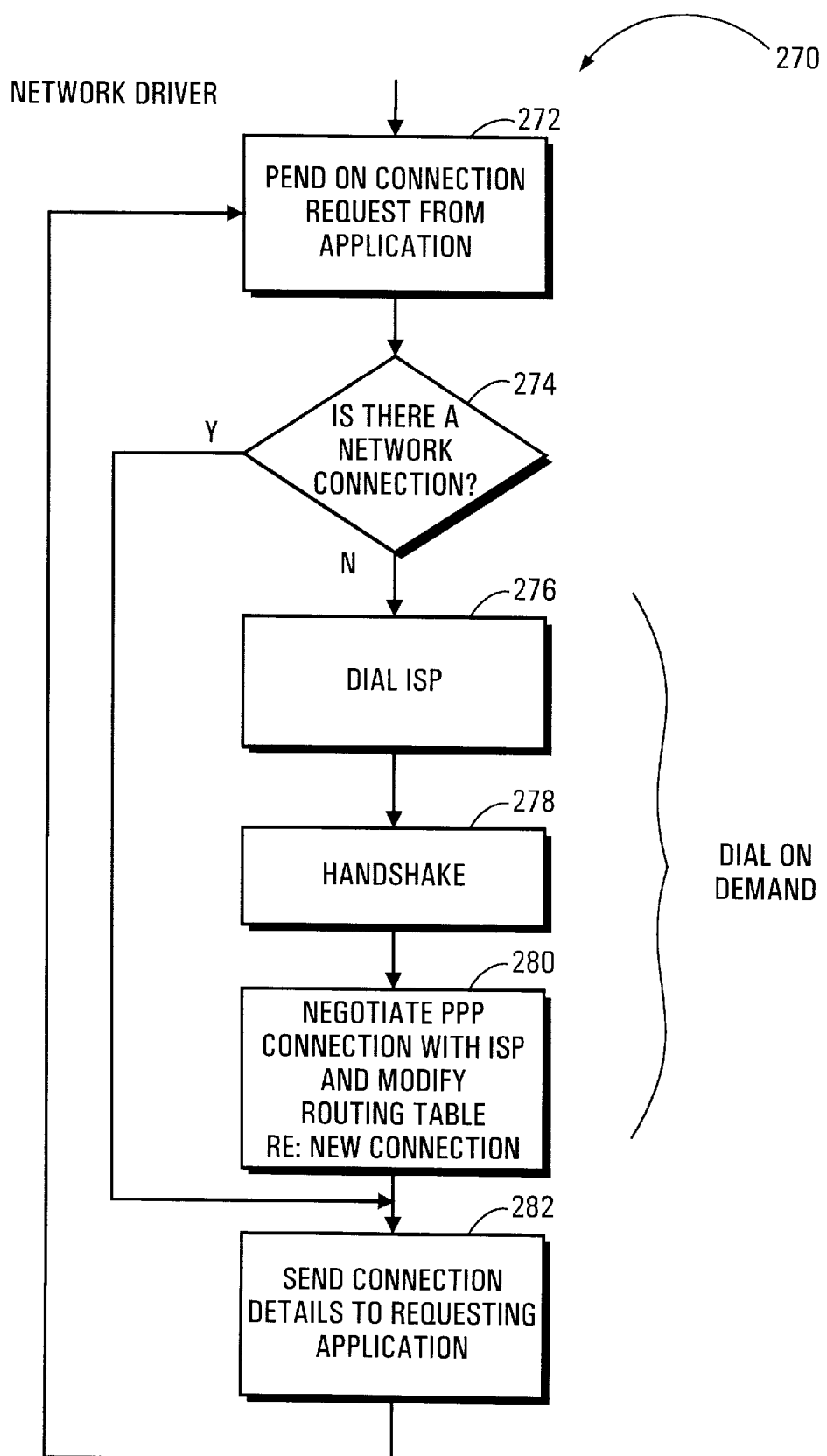
FIG. 13 is a flowchart of a network driver run by the system processor of the telephone.

Referring to FIG. 13, if a connection is requested by an application, the network driver 270 included within the operating system file 165 shown in FIG. 6 is run. The network driver task includes a first instance 272 which directs the system microprocessor 90 to pend awaiting a connection request from the browser thread shown in FIG. 12.

On receiving a connection request, instance 274 directs the system microprocessor 90 to check the routing table 155 shown in FIG. 7 to determine whether or not a network connection has already been established. Referring to FIG. 13, if no such connection has been established, instance 276 directs the system microprocessor 90 to command the modem 130 to connect to the second subscriber line 58 to place a telephone call over the public switched telephone network to the Internet services provider 24 shown in FIG. 1.

Referring back to FIG. 13, establishment of a connection with the Internet services provider involves a handshaking instance 278.

On establishing a connection with the Internet services provider, instance 280 directs the processor to negotiate a point to point protocol (PPP) connection with the Internet services provider and to store the details of the PPP connection in the routing table 155. A network connection is thus created.

Instance 282 then directs the system microprocessor 90 to notify the requesting application of the connection to the resource specified by the URL in the data field 250 of the event record.

On completion of transmission of the details to the browser thread, the system microprocessor 90 is directed back to instance 272 where it pends on receipt of a further connection request from the browser thread.

It should be noted that at instance 274, where the processor is directed to determine whether or not a connection has already been established, if such a connection has already been established, the processor is directed directly to instance 282 where it notifies the requesting application of such connection. The network driver system processor and central office line interface thus act as means for establishing communications between the subscriber telephone and the first network resource.

Referring back to FIG. 12, notification of the connection established by the network driver task shown in FIG. 13 is received at instance 290 in FIG. 12.

Still referring to FIG. 12, if no connection has been made and no connection can be established, instance 292 directs the system microprocessor 90 to display an error banner to indicate that the connection could not be established. The processor is then returned back to the pend instance 262.

If at instance 290, notification of a connection has been established, instance 294 directs the processor to receive and decode an HTML file from the resource specified by the URL in the FSK message. The HTML file is received and stored in the temporary directory 166 in the FLASH 156. The system processor, central office line interface and browser files thus act as means for downloading a file from the first network resource in response to the first uniform resource locator.

In addition, it will be appreciated that the event parser files, the main event handler files and the event dispatcher files cooperate with the system microprocessor to act as means for extracting the first network resource locator from the FSK message for presentation to the web browser.

Instance 295 then directs the processor to determine whether or not the HTML file has been successfully decoded, according to well known browser decoding criteria. In this embodiment, the browser includes a security manager which imposes restrictions on what hosts any applets within the HTML file can communicate with. In particular in this embodiment, applets are restricted from reading or writing to the flash memory shown in FIG. 6. Applets may only open socket connections to the host that served them. They are not permitted to open server sockets themselves, they are not permitted to start other processes on the local host and they are not permitted to have native methods. Thus, the security manager acts as means for preventing running applets from accessing the FLASH memory.

If the HTML file was not successfully decoded, the processor is directed to the error banner instance 292. If the HTML file was successfully decoded, instance 296 directs the processor to spawn threads on each applet, if any, contained in the HTML file. After spawning such threads, the processor is returned to the pend instance 262. The browser, system microprocessor and central office line interface thus act as means for receiving the applet from the first network resource in response to the first uniform resource locator in the FSK message.

FIG. 14

Figure 14:
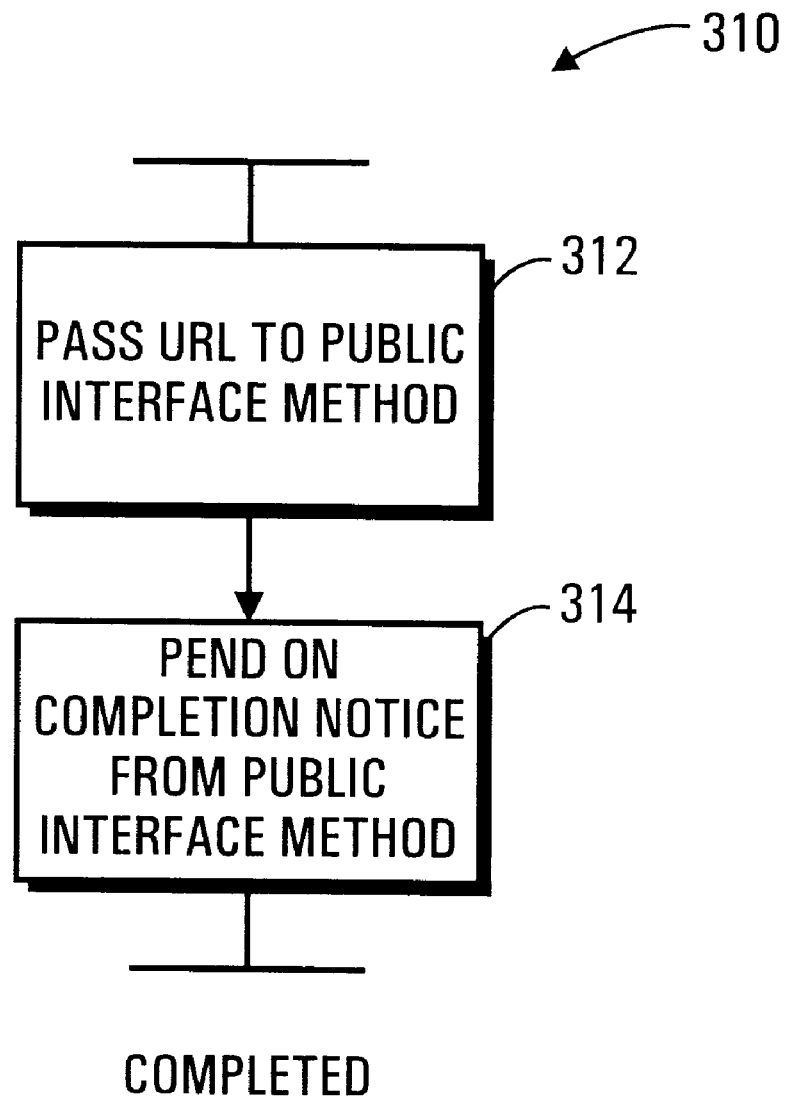
FIG. 14 is a flowchart of an applet thread run by the system processor of the telephone.

Referring to FIG. 14, an applet thread, such as spawned at instance 296 of the browser thread shown in FIG. 12, is shown generally at 310 in FIG. 14. The applet thread includes a first instance 312 which directs the system microprocessor 90 to pass a pre-stored second uniform resource locator (URL) contained within the applet to the public interface method shown in FIG. 15. Instance 314 then directs the processor to pend, awaiting a completion notice from the public interface method shown in FIG. 14. The system microprocessor, browser files and central office line interface thus act as means for downloading from a first network resource to the subscriber telephone or means for providing a first applet including a second network resource locator identifying a second network resource. In addition, these components act as an applet viewer or means for running the applet.

FIG. 15

Figure 15:
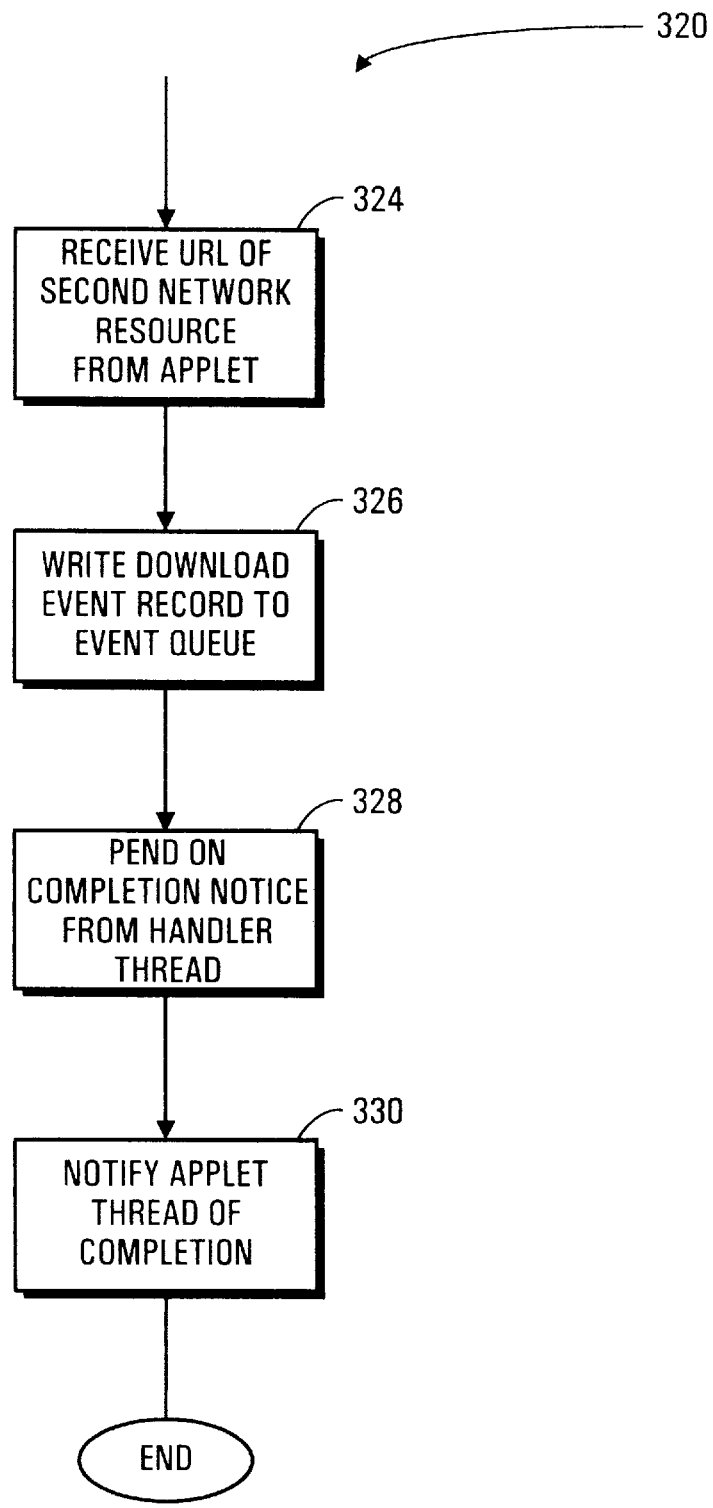
FIG. 15 is a flowchart of a public interface method by the system processor of the telephone.

Referring to FIG. 15, the public interface method is shown generally at 320 and begins with instance 324 which directs the system microprocessor 90 to receive the second URL from the calling applet. Instance 326 then directs the processor to create a download event code record in the event queue buffer 206 shown in FIG. 7. The download event record includes a download event code, the second URL received from the applet and a password. Instance 328 then directs the processor to pend for receipt of a completion notice from the handler thread shown in FIG. 16. The public interface files and system processor thus act as means for communicating with the applet to receive the second network resource locator from the applet.

FIG. 16

Figure 16:
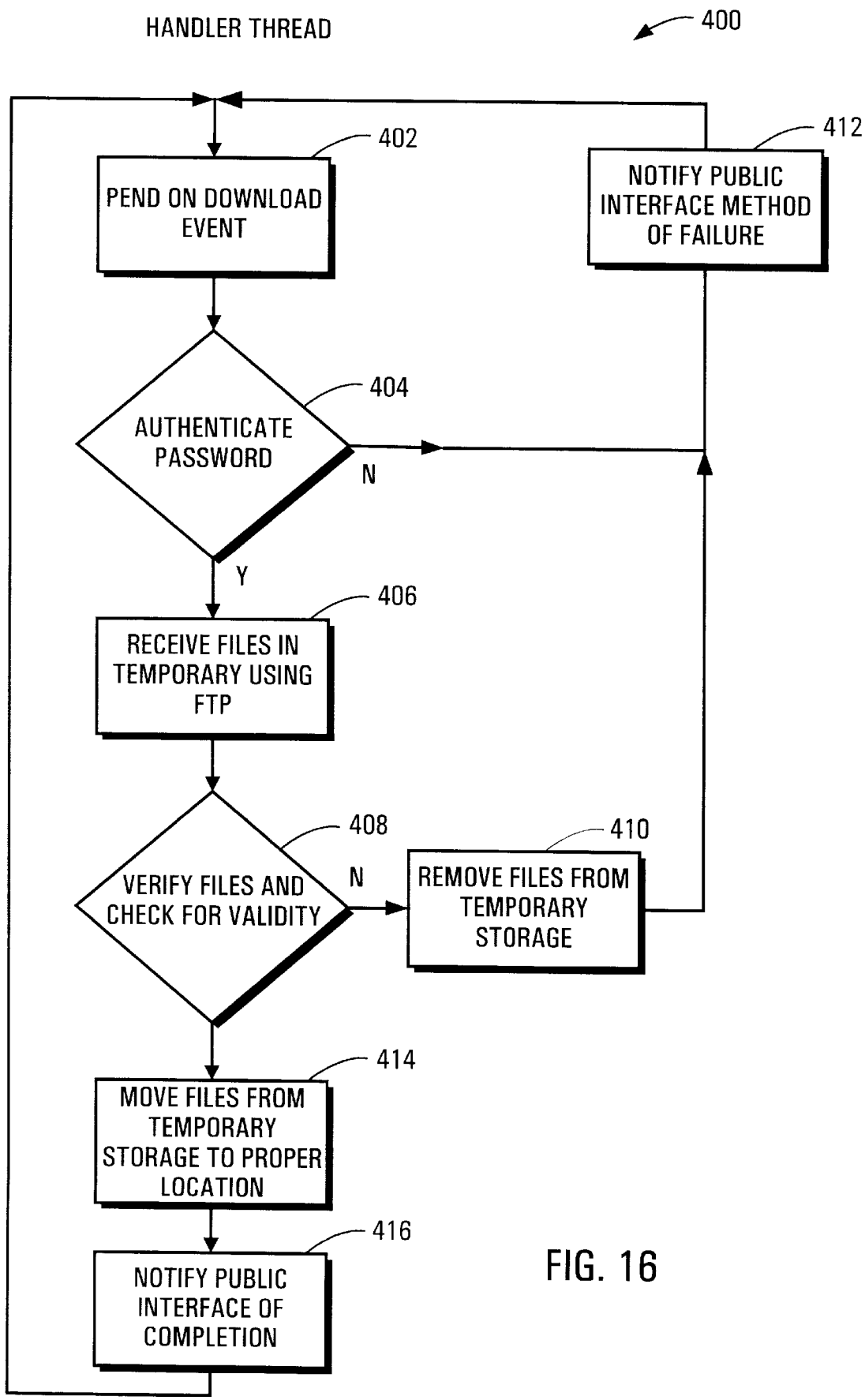
FIG. 16 is a flowchart of a handler thread run by the system processor of the telephone.

Referring to FIG. 16, the handler thread is shown generally at 400 and includes at first instance 402 at which it pends on receipt of a download event record from the event dispatcher shown in FIG. 11. (In the description thus far, the download event record was entered into the event queue by the public interface method.)

Upon receipt of a download event record, instance 404 compares the password from the download event record with a predefined password, and if the password does not match, instance 412 directs the processor to send a message to the public interface to indicate that a download could not occur.

If at instance 404 the password is authenticated, instance 406 directs the processor to receive files using the file transfer protocol, from the second network resource identified by the second URL. The system processor, central office line interface and handler files thus act as means for downloading a content file or providing a content file to the subscriber telephone from the second network resource. More particularly, the system processor, central office line interface and handler files act as means for establishing communications between the telephone and the second network resource and for downloading the file from the second network resource in response to the second uniform resource locator extracted from the applet.

At the resource specified by the second URL, files operable to be downloaded are named and formatted into directories of the same names as those in the FLASH memory 156 of the telephone and are grouped into Java file packages named after the corresponding directories. The Java file packages are compressed according to the ZIP algorithm and are stored at the resource as ZIP files named after the corresponding file packages. The ZIP files are transmitted to the system microprocessor 90 in the telephone, using the file transfer protocol.

When the ZIP files are received at the system processor, they are uncompressed or exploded and are stored as decompressed files in the temporary subdirectory 173. The system processor and handler files thus act as means for decompressing the file from the second resource to produce a plurality of decompressed files.

Instance 408 then directs the processor to verify and check the files received by determining whether or not checksums match and whether or not the uncompressed files have acceptable package names. If the files do not have acceptable package names, instance 410 directs the processor to remove the files from the temporary storage directory and to proceed to instance 412 to notify the public interface that the files are not acceptable. The system processor and handler files thus act as means for verifying the file has been received in accordance with predefined criteria.

If the files are acceptable, instance 414 directs the processor to move them from the temporary directory to the appropriate directories in the file system, as determined by the names and directory structures associated with the files. After the files have been moved, instance 416 directs the processor to notify the public interface method of completion and the processor is returned to the pend instance 402. Thus, the system processor and handler files act as means for extracting a name of the file or password from the file and for comparing the name or password against a name or predefined name or password defined by the directory structure in the telephone and for storing the file in the memory when the password matches the predefined password. These components also act as means for extracting a filename from the file from the second network resource and means for loading the file into an area of memory associated with the filename.

Referring back to FIG. 15, when the notice of completion from the handler thread is received at instance 328, instance 330 directs the processor to notify the applet thread shown in FIG. 14, of completion and the public interface method shown in FIG. 15 is completed.

The applet thread shown in FIG. 14 is thus notified of completion at instance 314 and the applet thread is completed.

To this point, therefore, there has been disclosed a method and apparatus for downloading a file to a subscriber telephone.

Operation

Referring to FIG. 1, the content provider 26 includes a web server 350 and a database of compressed files 352 containing Java classes for implementing the Java applications 161 in the subdirectory 175 applications shown in FIG. 6. The compressed files are compressed according to the ZIP (tm) format and may include directories of files. Thus, entire directories and files are zipped into a compressed format and are stored as single files in the database.

The first Java applet provider 25 includes a web server 354 and a plurality of Java applets 356 containing uniform resource locators identifying the first content provider and compressed files stored in the content provider database files 352.

Referring to FIG. 2, the feature records 40 have URL fields 50 which identify the individual applets 356 at the Java applet provider 25 shown in FIG. 1. Thus, when a user requests an additional feature such as email capability, fax interface, screen saver, etc., the user pays an administrator of the service, and the administrator enters at the administrator terminal 34 shown in FIG. 2, a request for a change in service, the user's telephone number, the CPE ID of the equipment to be changed and an identification of the desired feature. In response, the SRA server 16 dispatches an SRA message through the on public packet switched network link 66, in the format shown at 31 in FIG. 3.

Referring back to FIG. 1, the SRA message is received at the central office service unit 18 which establishes a connection between it and the central office switch 22 over the trunk 68 enjoying a special class of service to establish a suppressed ring access connection to the user telephone 20. When such connection has been made, the central office service unit 18 sends a suppressed ring connection message as shown generally at 70 in FIG. 3, to the telephone 20 as shown in FIG. 1.

The telephone receives the SRC message 70 through the event parser thread 220 shown in FIG. 9 and the main event handler thread 240 shown in FIG. 10 which load the event queue buffer 206 with a URL event code and the contents of the parameter data field 82 which contains the URL of an HTML file 356 containing a Java applet at the Java applet provider 25 as shown in FIG. 1. The HTML file includes an applet with a first URL identifying a file on the first content provider 26.

Referring to FIGS. 1 and 12, the browser thread 260 directs the system microprocessor 90 to establish a connection with the Internet services provider 24 and the network driver 270 shown in FIG. 13 establishes a network connection between the telephone 20 and the Java applet provider 25 through the central office switch 22, the Internet services provider 24 and the world-wide web 23. The Java applet provider 25 transmits the HTML file containing the applet back to the telephone 20 and such HTML file is received in the temporary directory 173 shown in FIG. 6. The browser thread 260 then spawns applet threads on each applet included in the HTML file received.

The applets provided by the Java applet provider 25 include second uniform resource locators identifying compressed files 352 at the content provider 26 and thus referring to FIG. 14, the applet calls the public interface method 320 shown in FIG. 15 and passes to the public interface method, the second URL of the file in the content provider 26 shown in FIG. 1.

The public interface method 320 then creates a download event record in the event queue buffer 206 shown in FIG. 7, indicating that a URL event has occurred and specifies the second URL provided by the applet for use by the handler thread 400 in FIG. 16.

The handler thread 400 receives the URL event code from the event dispatcher shown in FIG. 11 and makes a connection to the first content provider 26, which acts as a second network resource. The file identified by the second URL is transmitted back to the telephone 20 using the file transfer protocol. Instance 408 verifies the file as being an approved type for inclusion in the extensions subdirectory 177 shown in FIG. 6 and the file is copied from the temporary subdirectory 173 into the appropriate associated sub-directory within the extensions subdirectory 177. The classes contained within the file may then interact within other classes within the system directory 167 and control system resources to effect the new functionality requested by the user.

It will be appreciated that files for implementing certain functions such as email, fax interface and the like, are relatively large files including many kilobits of program code. Thus, use of the suppressed ring access connection to transmit to the telephone the location of an applet identifying a further location, where such a relatively large file is located, effectively enables a telephone to be informed that a file is to be downloaded. The subsequent downloading of the file using the applet and the content provider is done using the modem for data transfer rather than by simple FSK messaging which would take an inordinately long time to transfer such large files. Thus, the FSK messaging is merely used to initiate the download process and the actual download process takes place by high speed data transmission using modems.

The use of the applet server, rather than directly accessing the content provider, in conjunction with a level of security which prevents applets from access to system resources within the telephone ensures that system resources are guarded from control by programs and applets not authorized to access system resources.

Second Embodiment

Referring to FIG. 1, a system for distributing advertising content and for displaying advertising content on a telephone, according to a second embodiment of the invention, includes the entire system as described in the first embodiment with the exception that the first Java applet provider and first content provider are replaced with a second Java applet provider 360 having a web interface 362 and a plurality of instruction files 364 containing Java applets and a second content provider shown generally at 366 including a web interface 368 and a plurality of advertising content or marketing files 370 in an HTML format. In this embodiment, the applets 364 include uniform resource locators pointing to respective advertising content files 370 at the second content provider 366 and are contained within instruction files for directing the system processor to display such advertising content files on the display 102. Thus, the second content provider acts as means for storing at a network resource an advertising content file containing an advertisement.

Referring to FIG. 2, one of the feature records 40 is related to a marketing feature and, therefore, contains a third URL identifying the second Java applet provider 360. Thus, when an advertiser desires that an advertisement be downloaded to a telephone, the advertiser makes a request at the administrator terminal 34 and identifies a list of user telephones, by telephone number and CPE ID, if available, which are to receive the advertisement. In response, the SRA server 16 dispatches a plurality of SRA messages on the public packet switched network link 66 in the format shown at 31 in FIG. 3 to respective recipient telephones. In other words, the SRA server acts as a modified ring access server for producing a modified ring access message including a first network resource locator identifying a first network resource from which an instruction content file containing instructions for downloading an advertising content file are available.

Referring back to FIG. 1, one of the SRA messages received at the central office service unit causes the central office service unit to establish a connection between it and the central office switch 22 over the trunk 68 and to establish a suppressed ring access connection to the user telephone 20. When such connection has been made, the central office service unit 18 sends a suppressed ring connection message as shown generally at 70 in FIG. 3, in an FSK format to the telephone 20 as shown in FIG. 1. The telephone receives the SRC message 70 through the event parser thread 220 shown in FIG. 9 and the main event handler thread 240 shown in FIG. 10, which load the event queue buffer 206 with the URL event code and the contents of the parameter data field 82 which contains the third URL which identifies an instruction file 364 containing a Java applet at the Java applet provider 360 shown in FIG. 1. Thus, the FSK receiver event parser files, main event handler files and system processor act as means for receiving a network resource locator identifying a network resource in an FSK message received at the telephone in a modified ring access class of call. The instruction file includes an applet and a fourth network resource network resource locator, ie., a fourth URL identifying an advertising content file 370 at the second content provider 366.

Referring to FIGS. 1 and 12, the browser thread 260 directs the system microprocessor 90 to establish a connection with the internet services provider 24 and the network driver 270 shown in FIG. 13 establishes a network connection between the telephone 20 and the Java applet provider 360 through the central office switch, the internet services provider 24 and the world-wide web 23. The Java applet provider 360 transmits the instruction file containing the applet back to the telephone 20 and such instruction file is received in the temporary directory shown in FIG. 6. The browser thread and system processor thus act as means for receiving an applet containing a network resource locator. These components and the temporary directory act as means for storing the instruction file in memory at the telephone. The browser thread 260 then spawns applet threads on each applet included in the instruction file received.

The applets provided by the Java applet provider 360 include uniform resource locators identifying compressed advertising content files 370 at the second content provider 366 and thus, referring to FIG. 14, the applet calls the public interface method 320 shown in FIG. 15 and passes to the public interface method the URL of such advertising content file 370 in the second provider 366 shown in FIG. 1.

Referring to FIG. 15, the public interface method 320 then creates a download event record in the event queue buffer 206 shown in FIG. 7, indicating that a URL event has occurred and specifies the URL provided by the applet for use by the handler thread 400 in FIG. 16.

The handler thread 400 receives the URL event code from the event dispatcher shown in FIG. 11 and makes a connection to the second content provider 366. The advertising content file 370 identified by the second URL is then transmitted back to the telephone 20 using the file transfer protocol. The handler thread and system microprocessor thus act as means for running an applet at the telephone to establish communications between the telephone and a network resource and to download the advertising content file to the telephone. Instance 408 verifies the downloaded advertising content file as being an approved type for inclusion in the extensions subdirectory 177 shown in FIG. 6 and the file is copied from the temporary subdirectory 173 into the marketing subdirectory 205. The classes contained within the advertising content file then interact within other classes within the system directory 167 and control system resources to display the contents of the advertising content file on the display.

In this second embodiment, the system works generally as described in connection with the first embodiment with the exception that one of the advertising content files 370 is received from the second content provider at instance 406 of the handler thread 400 of FIG. 16 and is loaded into the marketing directory shown in FIG. 6. After the advertising content file is loaded into the marketing directory, the applet originally loaded from the second Java applet provider or an applet already existing at the telephone is operable to retrieve the file and display its contents on the display 102.

The entire content of the advertising content file from the content provider is displayed in a browser window occupying substantially the entire display 102. Thus, marketing or advertising content is automatically displayed on the display. The browser has no navigation tools or buttons and, therefore, the advertisement is displayed unobstructed. The browser and system microprocessor thus act as means for executing the advertising content file within a browser having a browser window occupying substantially an entire display at the telephone such that the advertisement is substantially unobstructed.

The advertising content file is written in HTML and may include a plurality of links which the user can select using an input device (not shown) and such links may be used by the browser to connect to another resource on the world-wide web or to connect to a resource within the telephone itself. Such resource would be stored in a sub-directory of the system subdirectory 167 shown in FIG. 6.

Applets may be used within the marketing HTML file from the second content provider to create animated marketing advertisements or presentations which may be more appealing to a user. In addition, high resolution pictures may be included within the advertising content file as GIF files or the like.

As HTML pages are for use on display screens of a predefined aspect ratio, advertising for use on telephones of the type described, can be simply and easily developed using conventional HTML page development techniques. This facilitates convenient creation of advertising content for the telephone.

Alternatively, the application sub-directory 175 may include applications which automatically cause advertising content files locally stored in the marketing subdirectory 205 to be displayed for marketing purposes by creating, in the event queue buffer 206, an event record including an URL event code and a URL specifying a resource within the FLASH memory 156. Or such applications may automatically create in the event queue buffer an event record including a URL event code and a URL specifying the second Java applet provider 360 to initiate a connection to the second Java applet provider and a subsequent download of an advertising content file from the second provider 366.

Such applications may include an instruction file operable to be run by the system processor at a predefined time, for example, to initiate the downloading of an advertising content file. Thus, the system processor and FLASH memory act as means for storing an instruction file at the telephone, the instruction file indicating when the advertising content file should be executed or means for storing an instruction file at the telephone, the instruction file including a network resource locator indicating the network resource from which the advertising content file is to be downloaded.

In the above manner, the display of advertising content file can occur autonomously from within the telephone and may initiate the display of advertising content files stored within the directory structure or stored at an external resource location. Thus, the event queue buffer event dispatcher and system microprocessor act as means for executing the advertising content file in response to a predefined event at the telephone.

While specific embodiments of the invention have been described and illustrated, such embodiments should be considered illustrative of the invention only and not as limiting the invention as construed in accordance with the accompanying claims.

What is claimed is:

1. A method for communicating a network resource locator to a telephone, the method comprising:
   producing a modified ring access message including a first network resource locator identifying a first network resource;
   transmitting a representation of said first network resource locator to said telephone; and
   downloading from said first network resource to said telephone an applet including a second network resource locator identifying a second network resource.

2. A method as claimed in claim 1 further including producing a modified ring access connection message including said first network resource locator, in response to said modified ring access message and communicating said modified ring access connection message to said telephone.

3. A method as claimed in claim 2 further including representing said modified ring access connection message by a frequency shift keyed (FSK) message.

4. A method as claimed in claim 3 further including establishing a connection between a central office switch and said telephone in response to said modified ring access connection message and transmitting said FSK message to said telephone.

5. A method as claimed in claim 1 further including downloading a content file from said second network resource to said telephone.

6. An apparatus for communicating a network resource locator to a telephone, the system comprising:
   means for producing a modified ring access message including a first network resource locator identifying a first network resource;
   means for transmitting a representation of said first network resource locator to said telephone; and
   means for downloading from said first network resource to said telephone an applet including a second network resource locator identifying a second network resource.

7. An apparatus as claimed in claim 6 further including means for producing a modified ring access connection message including said first network resource locator, in response to said modified ring access message and means for communicating said modified ring access connection message to said telephone.

8. An apparatus as claimed in claim 7 further including means for representing said modified ring access connection message by a frequency shift keyed (FSK).

9. An apparatus as claimed in claim 8 further including means for establishing a connection between a central office switch and said telephone in response to said modified ring access connection message and means for transmitting said FSK message to said telephone.

10. An apparatus as claimed in claim 6 further including means for downloading a content file from said second network resource to said telephone.

11. A system for communicating a network resource locator to a telephone, the system comprising:
   a modified ring access server for producing a modified ring access message including a first network resource locator identifying a first network resource; and
   the first network resource operable to provide to said telephone an applet including a second network resource locator identifying a second network resource.

12. A system as claimed in claim 11 further including a central office service unit for producing a modified ring access connection message including said first network resource locator, in response to said modified ring access message.

13. A system as claimed in claim 12 wherein said modified ring access connection message is represented by a frequency shift keyed (FSK) message.

14. A system as claimed in claim 13 further including a central office switch operable to establish a connection to said telephone in response to said modified ring access connection message and to transmit said FSK message to said telephone.

15. A system as claimed in claim 11 further including a second network resource operable to provide a content file to said telephone.

16. A telephone comprising:
    a central office line interface for receiving a frequency shift keypad (FSK) message including a network resource locator;
    a transceiver for establishing a connection to a network resource in response to said network resource in response to said network resource locator in said FSK message;
    a processor in communication with said central office line interface; and
    memory accessible by said processor for storing codes operable to direct said processor to perform the functions of:
        a browser for downloading from said network resource an applet including a
        second network resource locator;
        an applet viewer for running said applet;
        a public interface for communicating with said applet to receive said second network resource locator from said applet;
        a security manager for preventing running applets from accessing said memory; and
        a handler having access to said memory, said handle being in communication with a second network resource identified by said second network resource locator to receive and store in said memory, a file from said second network resource.

17. A telephone as claimed in claim 16 wherein said processor is programmed to decompress said file from said second network resource to produce a plurality of decompressed files.

18. A telephone as claimed in claim 17 wherein said processor is programmed to verify said file has been received in accordance with predefined criteria.

19. A telephone as claimed in claim 18 wherein said processor is programmed to extract a password from said file and compare said password with a predefined password and to store said file in said memory when said password matches said predefined password.

20. A telephone as claimed in claim 19 wherein said processor is programmed to extract a filename from said file from said second network resource and load said file into an area of memory associated with said filename.

21. A telephone as claimed in claim 20 further including an event parser at said telephone for extracting said network resource locator from said FSK message for presentation to said browser.

* * * * *